(12) United States Patent
Karimoto et al.

(10) Patent No.: US 7,500,187 B1
(45) Date of Patent: Mar. 3, 2009

(54) CREATION ASSISTING METHOD AND APPARATUS UTILIZING ELEMENT INDEXES

(75) Inventors: Hiroyasu Karimoto, Kanagawa (JP); Yushi Ogino, Hyogo (JP); Hideyuki Hagiwara, Tokyo (JP)

(73) Assignees: Panasonic Corporation, Osaka (JP); Contents Co., Ltd., Kanagawa (JP)

( * ) Notice: Subject to any disclaimer, the term of this patent is extended or adjusted under 35 U.S.C. 154(b) by 1663 days.

(21) Appl. No.: 09/869,647

(22) PCT Filed: Nov. 1, 2000

(86) PCT No.: PCT/JP00/07703

§ 371 (c)(1),
(2), (4) Date: Jul. 2, 2001

(87) PCT Pub. No.: WO01/33479

PCT Pub. Date: May 10, 2001

(30) Foreign Application Priority Data

Nov. 4, 1999 (JP) .................................. 11-314049

(51) Int. Cl.
*G06F 17/21* (2006.01)
*G06F 17/24* (2006.01)
(52) U.S. Cl. .................... 715/255; 715/201; 715/764; 707/100; 707/104.1; 707/200
(58) Field of Classification Search ................ 715/764, 715/500.1, 201, 255; 84/611; 707/104.1, 707/205, 20, 100, 200
See application file for complete search history.

(56) References Cited

U.S. PATENT DOCUMENTS

| | | | | |
|---|---|---|---|---|
| 5,274,758 A | * | 12/1993 | Beitel et al. .............. | 715/500.1 |
| 5,742,283 A | * | 4/1998 | Kim ........................ | 715/500.1 |
| 5,801,685 A | * | 9/1998 | Miller et al. ............. | 715/500.1 |
| 6,072,479 A | * | 6/2000 | Ogawa ..................... | 707/104.1 |
| 6,103,964 A | * | 8/2000 | Kay ............................ | 84/611 |
| 6,340,978 B1 | * | 1/2002 | Mindrum .................... | 715/764 |

(Continued)

OTHER PUBLICATIONS

Smith, Leo, Out & About / Ventura County; shoptalk; Holliday Hallmark; It's huntinh season for cards with custom or preprinted greetings, Oct. 23, 1999 Las Angeles Times, p. 12.*

(Continued)

*Primary Examiner*—Joshua D Campbell
(74) *Attorney, Agent, or Firm*—Pearne & Gordon LLP

(57) ABSTRACT

Disclosed in the present invention is a creation production support method, for enabling the easy production of a large amount of creative material, within a short period of time, while reducing the labor effort required of a creator, and an apparatus and a storage medium therefor. Specifically, creative element data for a pair composed of a creative element and an element index are stored in a database (4), and the element index is extracted from the database (4) and is placed in a reactor (9). From this, a set of correlated element indexes is obtained, and creative elements corresponding to element indexes that constitute this set are coupled together and output. Then, a creation is automatically generated, and 5W1H information, indicating the contents of a corresponding creative element, and sensory information received from the creative element are written in the element index. When based on this information a correlation is obtained, a creation can be provided that can not be formed merely by the random linking of creative elements.

26 Claims, 18 Drawing Sheets

U.S. PATENT DOCUMENTS

| | | | |
|---|---|---|---|
| 6,557,013 B1 * | 4/2003 | Ziff et al. | 707/205 |
| 6,694,311 B1 * | 2/2004 | Smith | 707/4 |
| 6,694,482 B1 * | 2/2004 | Arellano et al. | 715/500.1 |

OTHER PUBLICATIONS

WO 96/30844, Support System for Automation of Story Structure Preparation, Oct. 1996.

K. Kuriyama et al., Authoring Support by Interactive Genetic Algorithm and Case Based Reasoning, In: Denki Gakkai Sangyou System Johouka Kenkyukai shiryou, No. ISS-98-25, Mar. 1998, pp. 13-18.

Shigeru Imai et al., Identeki Algorithm WO Mochiita Jidou Sakkyoku, In: Technical Research Report of the Institute of Electronics, Information and Communication Engineers, No. 98, No. 158 (AI98-9), May 1998, pp. 59-66.

* cited by examiner

FIG. 8A

○ ROPPONGI, BAR "NEW YORK CHAMBER," OUTLOOK

TOMOKO: "(ONLY VOICE) LOOK, ALL GLAZED! FANTASTIC!"

FIG. 8B

○ OFFICE, AT TOMOKO'S DESK

· TOMO-TOMO, OPENS A LUNCH BOX SHE PREPARED, AND LOOKS HAPPY.

· WHEN THE LUNCH BOX IS OPENED, A DOVE FLIES OUT!

· CLOSES THE LUNCH BOX, BUT OPENS IT AGAIN AND PEEPS IN.
　　THEN, HER LUNCH BOX BLOWS UP!

· TOMO-TOMO, CHARRED.

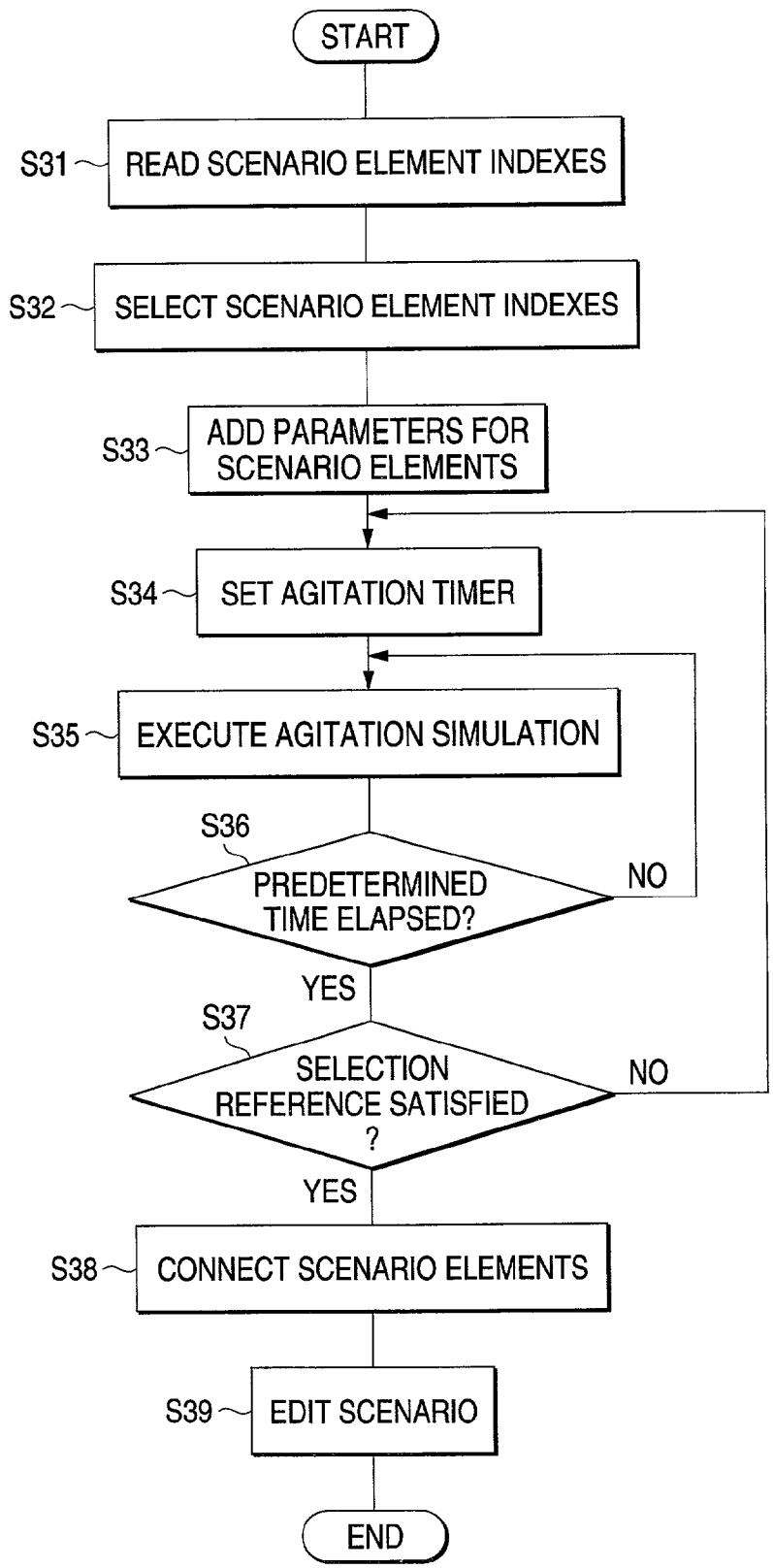

FIG. 23A

| | FACE | TRUNK OF A BODY | RIGHT ARM | LEFT ARM | RIGHT LEG | LEFT LEG |
|---|---|---|---|---|---|---|
| FACE | | 12 | 13 | 14 | 15 | 16 |
| TRUNK OF A BODY | 21 | | 23 | 24 | 25 | 26 |
| RIGHT ARM | 31 | 32 | | 34 | 35 | 36 |
| LEFT ARM | 41 | 42 | 43 | | 45 | 46 |
| RIGHT LEG | 51 | 52 | 53 | 54 | | 56 |
| LEFT LEG | 61 | 62 | 63 | 64 | 65 | |

NUMERALS DENOTE MOVEMENT PROGRAM NUMBERS.

* WHEN ONE PART OF THE BODY IS MOVED, THIS MOVEMENT AFFECTS OTHER PARTS VIA MOVEMENT PROGRAMS; FOR EXAMPLE, WHEN A FACE MOVES FORWARD AND BACKWARD, THE TRUNK OF A BODY DOES NOT MOVE, WHILE THE RIGHT ARM MOVES FORWARD, THE LEFT ARM MOVES BACKWARD, THE RIGHT LEG MOVES BACKWARD AND THE LEFT LEG MOVES FORWARD.

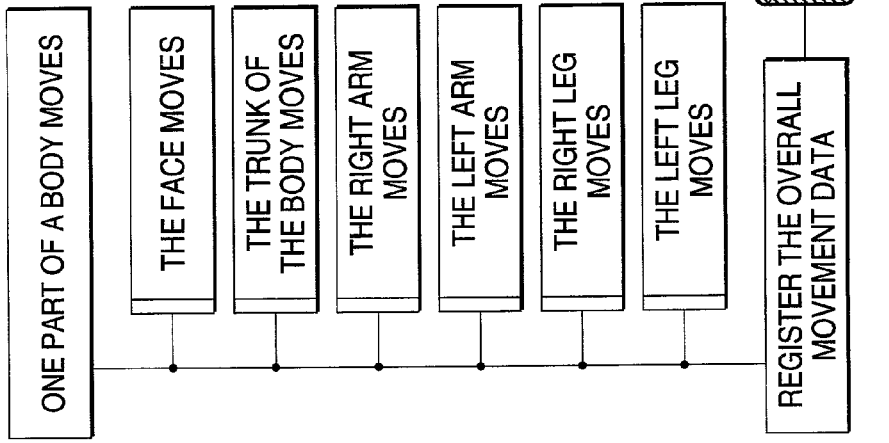

FIG. 23B

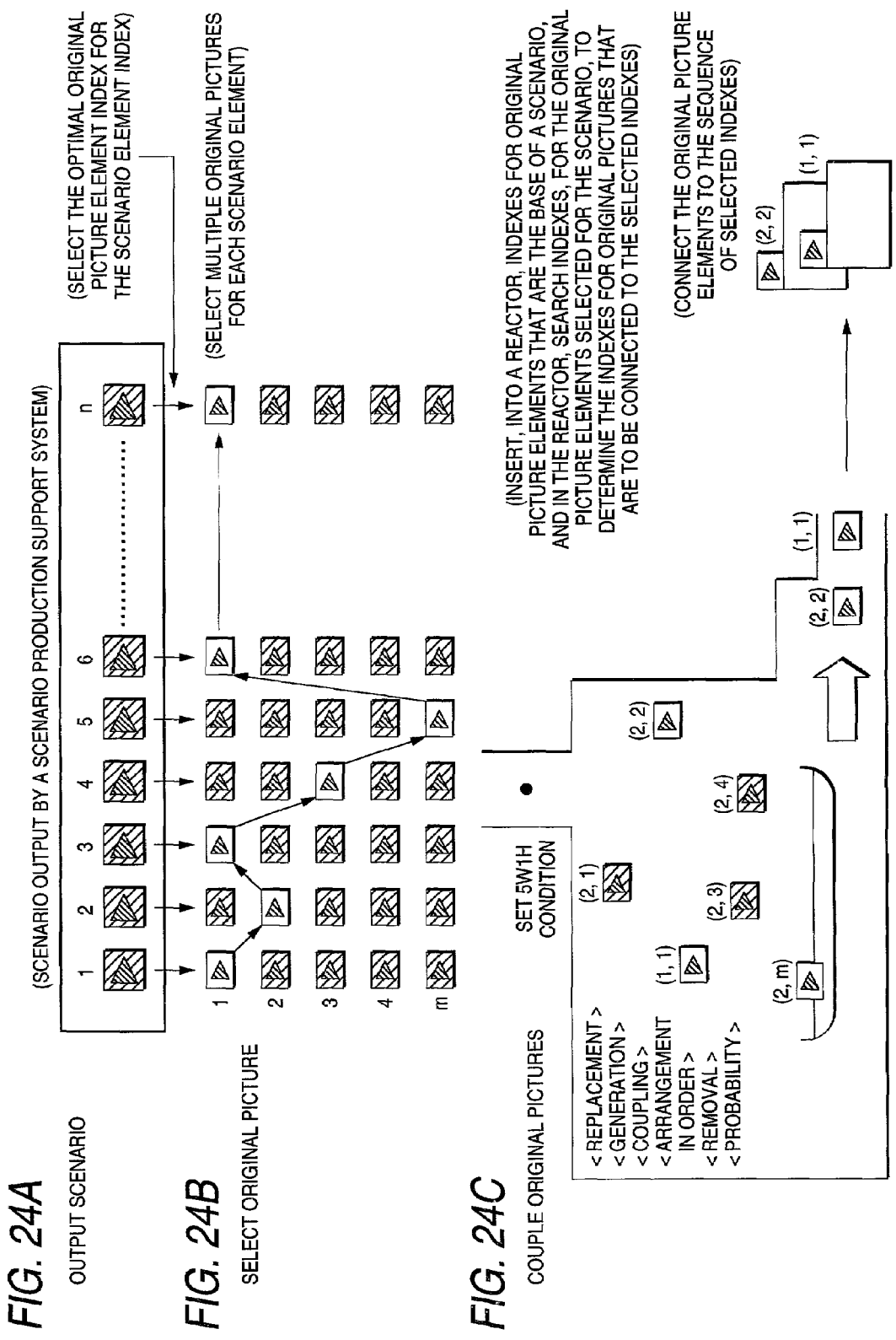

CREATION ASSISTING METHOD AND APPARATUS UTILIZING ELEMENT INDEXES

TECHNICAL FIELD

The present invention relates to a creation production support method and system for supporting the production of creations, such as music and scenarios, and a storage medium on which a creation production support program is stored.

BACKGROUND ART

Presently, for the preparation of a scenario that is to be used for an animated production for broadcasting and for a movie, the general rule is that while the editing of data may be performed by using a tool, such as a personal computer, the preparation of a plot, which constitutes the essence of a scenario, is still completely dependent on manual processing. That is, conventionally, no attempt has been made to automate the production of plots for scenarios by providing for the employment of a tool that can be incorporated in or run by a personal computer.

According to the conventional scenario creation method that is employed today, a writer uses either a word processor or application software, such as a word processing program, running on a computer to prepare and to subsequently print a draft manuscript. Thereafter, to obtain the finished product, an editor examines and corrects the text prepared by the writer.

As is described above, according to the conventional scenario creation method, since a scenario is the end product of a manual production process performed by a team, including a writer (creator) and an editor, only a limited number of scenarios can be produced. Further, since even when only one scenario is required much time must be expended for scenario production, and since scenario creation is a mentally fatiguing task, it is difficult for a small number of people to turn out a plurality of story manuscripts, regardless of whether the story plots are short.

Along with the application of the digital techniques that are now being employed for broadcasting, communication and packaged media, the supply of large quantities of high-quality story content became a necessity; and further, with the advent of the multi-channel age, as was embodied by the initiation of BS digital broadcasting, it was inevitable that the trend would be for producers to demand an ever greater supply of television program content. A demand has therefore arisen for a reduction in the number of steps involved in the production of scenarios, as well as a like reduction in the labor required of the writers who create the scenarios.

As is described above, to facilitate the provision of large quantities of high-quality story content, a demand has recently arisen for the development of a scenario creation environment that can contribute to an increase in the production of scenarios, while simultaneously reducing the labor required of creators. For since the present, conventional scenario creation process demands that a creator expend a great deal of effort to prepare a scenario, it is difficult to produce many scenarios within a short period of time.

The above described problems have arisen not only in relation to the production of scenarios, but also in relation to the general creative activities of individuals, such as in the composition of background music associated with a scenario, or music unrelated to the scenario, or the production of image data for animation, and there is a demand for the development of techniques for supporting such creative activities.

To resolve these problems, it is one objective of the present invention to provide a creation production support method and system whereby music, a scenario or an original picture can be semi-automatically created in accordance with desired settings, thus enabling many creations to be easily produced within a short period of time and reducing the labor effort required of creators, and to provide a storage medium on which such a creation production program is stored.

DISCLOSURE OF THE INVENTION

To achieve the above objective, a creation production support method according to the invention is characterized by: storing, in a database, elements of a creation along with added element indexes; extracting, from the database, element indexes for multiple elements of a creation that match a selection reference; calculating a correlation among information sets written in the extracted element indexes, and obtaining a set of element indexes whose correlation satisfies an evaluation reference; and linking creation elements corresponding to the element indexes that belong in the set, and outputting the results as a creation.

Preferably, the creation elements are either music elements, scenario elements or original picture elements, and the element indexes include 5W1H information that represents the contents of a pair of elements of a creation. Further, the information written in the element indexes consists of n sets of information to represent the written information by n-dimensional vectors, and the correlation among the element indexes is evaluated by using an angle formed by the n-dimensional vectors of the element indexes.

Also, preferably, the element indexes extracted from the database are simulated as pseudo points, and since the pseudo points are scattered throughout a pseudo processing tank, the correlation is obtained among element indexes that meet in the processing tank, and element indexes that satisfy the evaluation reference are linked together to form the set.

Further, to achieve the objective, for either a scenario, music or an original picture string providing a story (hereinafter referred to as a creation A, while one of the remaining creations is referred to as a creation B), a creation B corresponding to the creation A is automatically produced, by the creation production support method, using a creation element belonging to the creation B, to which an element index is added that includes the same information as information written in an element index that is added as a counterpart of a creation element of the creation A. The same information includes 5W1H information representing the content of the counterpart creation element, and sensory information.

To achieve the above objective, a creation production support apparatus is characterized by comprising: a database for storing creation elements with added element indexes; extraction means for extracting, from the database, element indexes for multiple creation elements that match a selection reference; calculation means for calculating a correlation among information sets written in the extracted element indexes, and for obtaining a set of element indexes whose correlation satisfies an evaluation reference; and output means for linking creation elements corresponding to the element indexes that belong to the set, and for outputting the results as a creation.

In the creation production support apparatus, preferably, the creation elements are either music elements, scenario elements or original picture elements, and the element indexes include 5W1H information that represents the contents of a pair of elements of a creation. Further, the information written in the element indexes consists of n sets of information to represent the written information by n-dimensional vectors, and the calculation means evaluates the correlation among the element indexes by using an angle formed by the n-dimensional vectors of the element indexes.

Also, preferably, the calculation means simulates, as pseudo points, the element indexes extracted from the database, and since the pseudo points are scattered throughout a pseudo processing tank, the correlation is obtained among element indexes that meet in the processing tank, and element indexes that satisfy the evaluation reference are linked together to form the set.

Further, to achieve the objective, for either a scenario, music or an original picture string providing a story (hereinafter referred to as a creation A, while one of the remaining creations is referred to as a creation B), the creation production support apparatus employs the creation production support method to automatically produce a creation B corresponding to the creation A, using a creation element belonging to the creation B, to which an element index is added that includes the same information as information written in an element index that is added as a counterpart of a creation element of the creation A. In this case, preferably, the same information includes 5W1H information representing the content of the counterpart creation element, and sensory information.

In the creation production support apparatus, the database is provided in an external storage device for a stand-alone computer. Or, the database is provided for a server connected to a LAN, and the extraction means, the calculation means and the output means are provided for a client connected to the LAN. Or, the database is provided for a server, and the extraction means, the calculation means and the output means are provided for a terminal device connected to the server via the Internet. Preferably, a program that includes the extraction means, the calculation means and the output means is downloaded from the server to the terminal device.

According to the creation production support method and the apparatus of the invention, the creation element data, which consist of the creation element and the element index pair, are stored in the database. The element index is extracted from the database, and a set of correlated element indexes is obtained by calculation. The creation elements that correspond to the element indexes of this set are then linked together, and the results are output. As a result, a creation can be automatically generated. Since the 5W1H information, representing the contents of the corresponding creation element, and the sensory information, obtained from the creation element, are written in the element index, correlation need only be obtained based on this information, so that a creation that can not be obtained merely by linking creation elements at random can be generated automatically.

To achieve the above objective, according to the invention, a scenario creation support apparatus comprises: storage means for storing scenario elements that constitute parts of scenarios and corresponding scenario element indexes; extraction means for extracting, from the storage means, a plurality of scenario element indexes that match a reference, predetermined scenario element selection; agitation means for performing, according to a pseudo physical rule, agitation simulation for the plurality of scenario element indexes, and for repeating the agitation simulation until a set of scenario element indexes are obtained that match an evaluation reference for a predetermined condition setting for a scenario creation; recovery means for comparing the scenario element indexes in the set with paired scenario elements to recover a set of scenario elements; scenario linking means for linking the set of scenario elements to generate and output a scenario; and editing means for changing predetermined phrases in the scenario elements of the scenario according to a predetermined table.

The storage means stores, as a pair, a scenario element and a scenario element index that jointly describe the contents of the scenario element, and the extraction means also extracts a scenario element index corresponding to a scenario element that matches the scenario element selection reference.

Each of the scenario element indexes includes at least one entry that corresponds to each setup for 5W1H and that describes a condition setting for the scenario element, and an entry of an adjective or an adjective verb that corresponds to the scenario element.

The agitation simulation is based on an agitation process for which genetic algorithms are used.

A scenario element is formed by providing, as a parameter, a condition setup required to perform the agitation simulation for the plurality of scenario element indexes stored in the storage means, and, based on the obtained scenario element, a simulation of an agitation process is performed for the scenario element indexes.

When the scenario element indexes are regarded as physical entities, the parameter includes the direction of movement and the speed of the physical entities, and a growth level that corresponds to a mass.

The agitation simulation includes a replacement process for changing, in consonance with a predetermined condition, one part of the entries in the scenario element indexes when a collision occurs among the scenario element indexes.

The agitation simulation includes a generation process for employing, in consonance with a predetermined condition, one part of the entries in the scenario element indexes to generate a new scenario element index and a new scenario element when a collision occurs among the scenario element indexes.

The agitation simulation includes a linking process for linking, in consonance with a predetermined condition, the scenario element indexes when a collision occurs among the scenario elements.

The agitation simulation includes an arrangement process for linking and arranging, in consonance with a predetermined condition, the scenario element indexes when a collision occurs among the scenario elements.

The agitation simulation includes an erasing process for erasing, in consonance with a predetermined condition, the scenario element indexes.

The agitation means, based on a scenario element provided as a parameter that employs a scenario pattern as a setting condition, executes a simulation of an agitation process using the scenario pattern.

According to the invention, a scenario creation support method comprises: a storage step for the storage of scenario elements, which are components of a scenario, and scenario element indexes, which represent the contents of the scenario elements; an extraction step for the extraction, from the scenario elements and the scenario element indexes stored in that are stored, of a plurality of scenario element indexes that match a predetermined scenario element selection reference; an agitation step for the performance, in accordance with a pseudo physical rule, of an agitation simulation for the plurality of scenario element indexes, and for the repetition of the agitation simulation until a set of scenario element indexes is obtained that, for scenario creation, match an evaluation reference for a predetermined condition setting; a recovery step for the recovery of a set of scenario elements by comparing the scenario element indexes in the set with paired scenario elements; a scenario linking step for the linking of the set of scenario elements to generate and output a scenario; and an editing step of employing a predetermined table to change, in the scenario elements, predetermined phrases of the scenario that is generated and output.

A recording medium according to the present invention is a computer-readable storage medium on which a program is stored for the execution of the scenario creation method.

In this invention, since a scenario is semi-automatically produced, in accordance with a desired setting, by the execution of the agitation simulation, many scenarios can be easily generated over a short period of time, while the labor required of a creator is reduced.

BRIEF DESCRIPTION OF THE DRAWINGS

FIG. 8 is a diagram showing an example scenario element;

FIG. 22 is a flowchart showing the processing, including the execution of an agitation simulation, performed by the scenario production system according to the second embodiment;

FIG. 23 is a diagram for explaining an example method used by an original picture production support apparatus according to a third embodiment when generating an original picture element to be stored in a database; and FIG. 24 is a diagram for explaining the processing for selecting original pictures related to the scenario that is automatically generated in the second embodiment.

Figure 1:
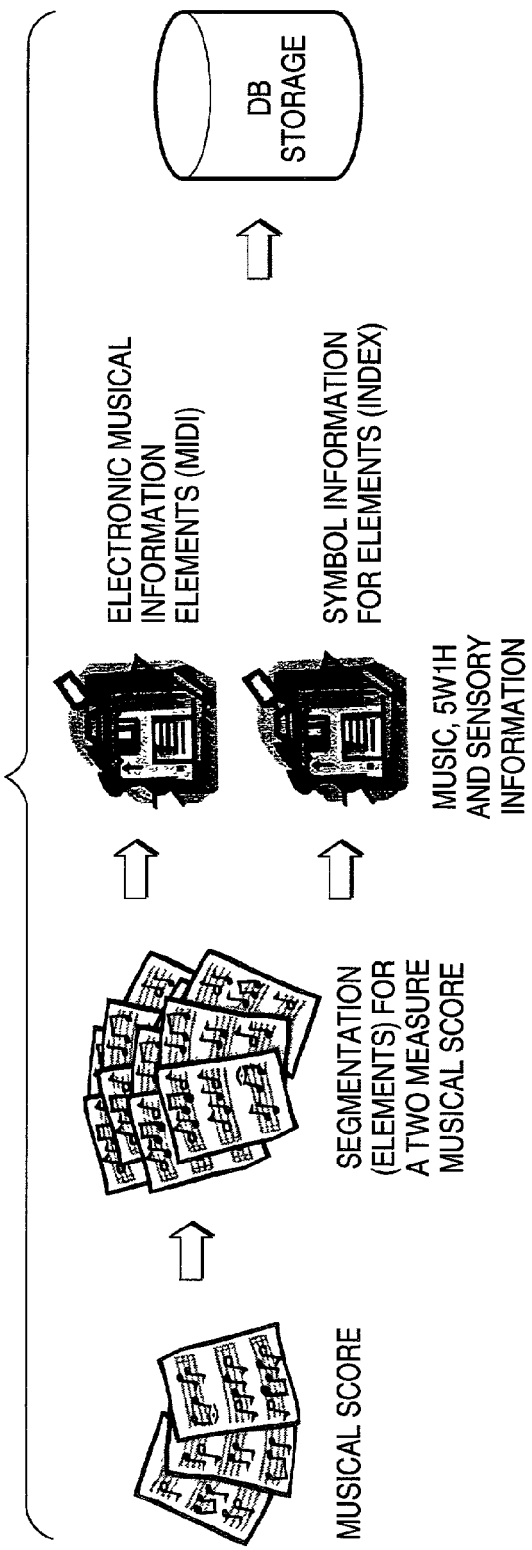
FIG. 1 is a schematic diagram for explaining a database generation method for a music production support apparatus according to a first embodiment of the invention.

It should be noted that reference numeral 1 denotes a creator; 2 denotes a creator terminal device; 3 denotes a communication network (a computer network and/or a communication network); 4 denotes a scenario database (a scenario element and a scenario element index database); 5 denotes a coordinator terminal device; 6 denotes a coordinator; 7 denotes a scenario element production condition setting unit; 8 denotes a scenario element index selector; 9 and 120 denote reactors; 10 denotes a scenario selector; 11 denotes a scenario connector; 12 denotes a scenario storage unit; 101 denotes a scenario element index; 102 denotes an obstacle condition; 103 denotes a nutritive element (bait); 121, 122, 123 and 124 denote storage boxes; a1 to a6, b1 to b6 and c1 to c6 denote entry data; Da, Db and Dc denote parameters (directions); Ga, Gb and Gc denote parameters (growth levels); and Va, Vb and Vc denote parameters (velocities).

BEST MODES FOR CARRYING OUT THE INVENTION

The best modes of the invention will now be described while referring to the drawings.

First Embodiment

In this embodiment, a music production support apparatus for automatically generating music will be described. The music production support apparatus is implemented by permitting a stand-alone computer, or a system constituted by multiple computers, interconnected by a local network (LAN) or the Internet, to read a music production support program from a storage medium or to download a program via a communication network.

FIG. 1 is a schematic diagram showing the database construction method used by the music production support apparatus. The music production support apparatus stores, in the database, an enormous amount of music element data, prepares a string of significantly coupled music element data, as will later be described in detail, and outputs the data string as automatically generated music data.

The music element data used in this embodiment are data that consist not merely of musical notes, but of at least two measures. So long as music is newly composed, the music element data may have a four or more measure length. However, as is shown in FIG. 1, a conventional musical score is divided into two measure lengths for use as music element data, and thus an enormous amount of music element data can be prepared.

The music element data in every two measure length is converted into musical electronic data (e.g., MIDI), and this data is stored in a database. The music production support apparatus, instead of coupling multiple sets of music element data at random, adds together music element indexes and music element data sets, at a one-to-one correspondence, and stores them in the database in order to provide significant, coupled music element data sets.

Figure 2:
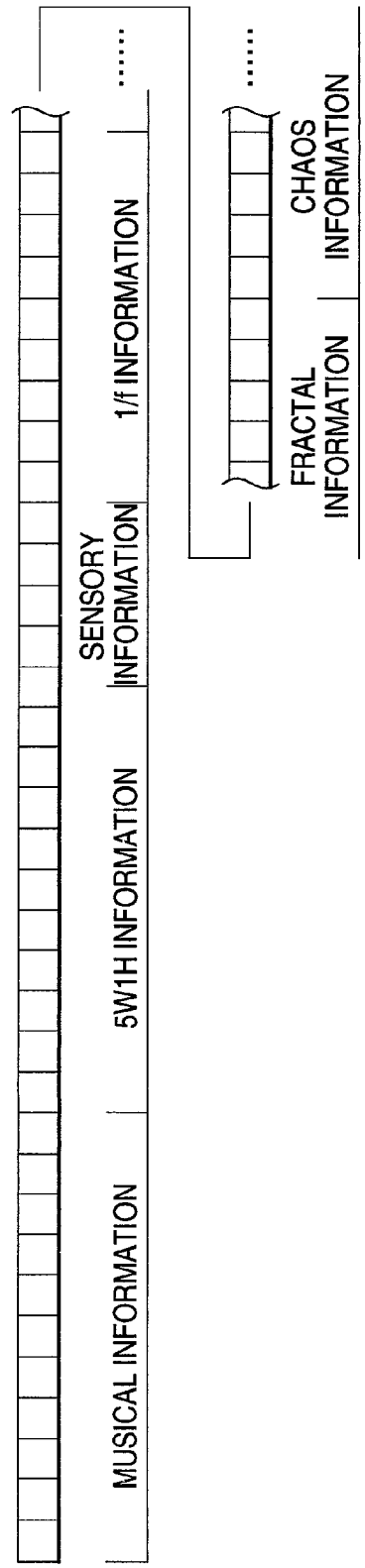
FIG. 2 is a conceptual diagram showing an example music element index.

FIG. 2 is a conceptual diagram showing an example music element index. In this embodiment, the music element index consists of musical information, 5W1H information, sense information, 1/f information, fractal information, chaos information and other information.

The musical information represents the genre of music, information for "the arrangement of musical notes", "phonetic shape", "tonality", "dynamic level", "velocity", information for "the number of measures", or information indicating "minuet", "Mozart tone" or "Beethoven tone". The musical information is entered in the corresponding column of the musical element index. For example, "classical music", "jazz", "rock-'n'-roll", . . . are provided as the columns for music genres, and information is entered by placing a tick in the pertinent column.

A database creator who has listened to music prepared from the musical elements enters his or her impressions as 5W1H information in the corresponding column of the musical element index. 5W1H information need not be provided in every instance. For example, if the database creator feels that two measures of music are appropriate for a "scene in an office during working hours when a person is tensely standing before his or her boss", a reference to the music is entered as 5W1H information in the pertinent column of the musical element index.

The sense information is written, in the corresponding column, as information represented by using an adjective, an adjectival verb, or a verb; for example, the "happy" level of two measures of music is "5" and the "calm" level is "2".

Since the musical element index to be added to one musical element data consists of n sets of information, the musical element index can be represented by an n-dimensional vector.

In this embodiment, being "significant" means that the angle formed by two n-dimensional vectors (two element indexes) is equal to or smaller than an evaluation angle. The 1/f information, the fractal information and the chaos information will be described later.

Figure 3:
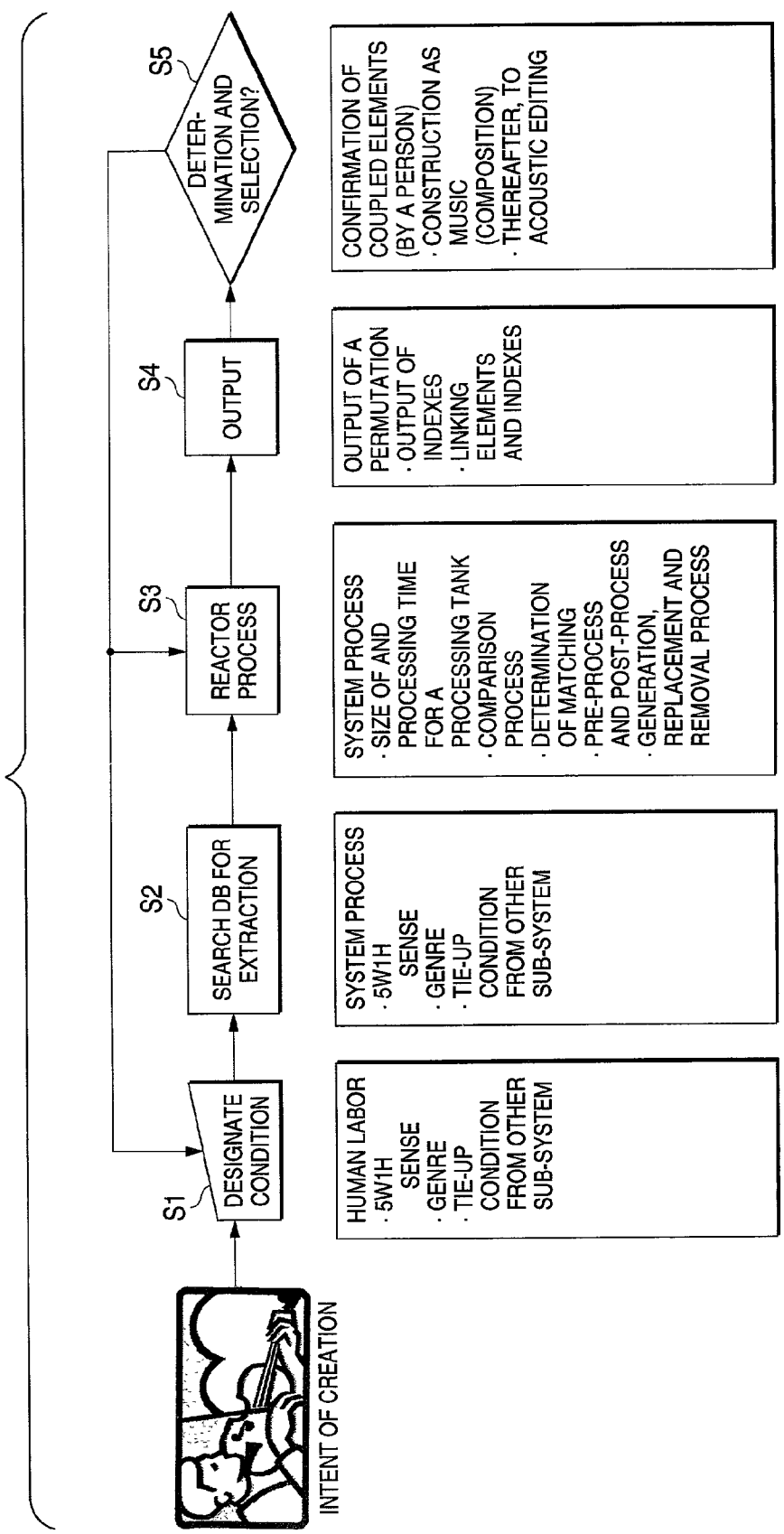
FIG. 3 is a diagram for explaining the processing for automatically generating music using music element data.

FIG. 3 is a diagram for explaining the processing for automatically generating music from the musical element data. First, at step S1, a creator who desires to automatically generate music designates a condition. According to this designation, one or multiple sets of information that are entered in the musical element indexes are employed. For example, to generate music having a "Mozart tone", that effect is designated.

Thus, at the following step S2, the musical element database is searched, and, for example, tens of thousands of Mozart tone musical element data are extracted from one million sets of musical element data. Of course, the music can be produced by using all the musical element data; however, when a check is performed to determine whether all the musical element data can be "significantly" coupled, an extended period of time is required, even when a high-level computer is used. Therefore, in accordance with the selection reference, the entire range or a limited range of the musical element data can be selected for use.

When the musical element data to be used are extracted, the musical element indexes are separated from these musical element data. Only these musical element indexes are then transmitted to the reactor, and only for these musical element indexes is the reactor process performed (step S3). During the reactor process, the musical element indexes extracted from the database are mixed, and sets of the musical element indexes that are "significant" relative to each other are generated. The reactor process functions as an agitation simulator.

For example, when a virtual processing tank in a closed space is prepared as a reactor, and when the individual musical element indexes are input to the processing tank as virtual points, the virtual points are scattered throughout the processing tank by providing progressive directions, velocities and service lifetimes at random. Then, the harmonic relationship between two musical element indexes that have collided in the processing tank is evaluated using the angle formed by the n-dimensional vectors. When this angle is equal to or smaller than the evaluation angle, the two musical element indexes are coupled. Which of the two musical element indexes should be positioned first is also determined in accordance with the musical element index contents.

When a new musical element index has collided in the processing tank with a string composed of coupled musical element indexes, whether this new musical element index is harmonically related to the musical element indexes in the string is determined based on the evaluation value. When the musical element indexes are harmonically related, the positions of an index string wherein these musical element indexes are to be inserted are determined, and the musical element indexes are inserted therein. The length of the musical element index string is increased by repeating this process.

Among the musical element indexes that are flying in the processing tank while they are flexibly reflected by virtual walls or virtual barriers, a musical element index that did not encounter another musical element index is extinguished when its service life has expired. For a musical element index that encountered nutritive elements virtually provided in the processing tank, the service life is extended, and the service life of the string of coupled musical element indexes is equal to the sum of the service lives of the musical element indexes.

When the reactor processing is performed for a predetermined period of time, a musical element index string having a length equal to or greater than a specific length is produced and output (step S4). Since multiple musical element indexes are obtained, when too many strings are to be output, the number of these musical element index strings can be limited by using a specific evaluation function. At step S4 for the output process step, electronic musical information (e.g., MIDI data) is coupled to corresponding musical element indexes for the string, and the results are output as electronic music. A creator who has listened to the electronic music can also edit this music so that it matches his or her musical sense.

The creator listens to the output electronic music and determines whether he or she likes it (step S5). When the creator does not like the music, program control can be returned to S1, and the process can be restarted by the designation of the condition. Or, instead of returning to step S1 for the designation of the condition, the condition of the reactor process (step S3) may be changed to automatically generate music again. To change the condition of the reactor process, it is possible to designate automatic music generation by using the 1/f information, the fractal information and the chaos information.

Figure 4:
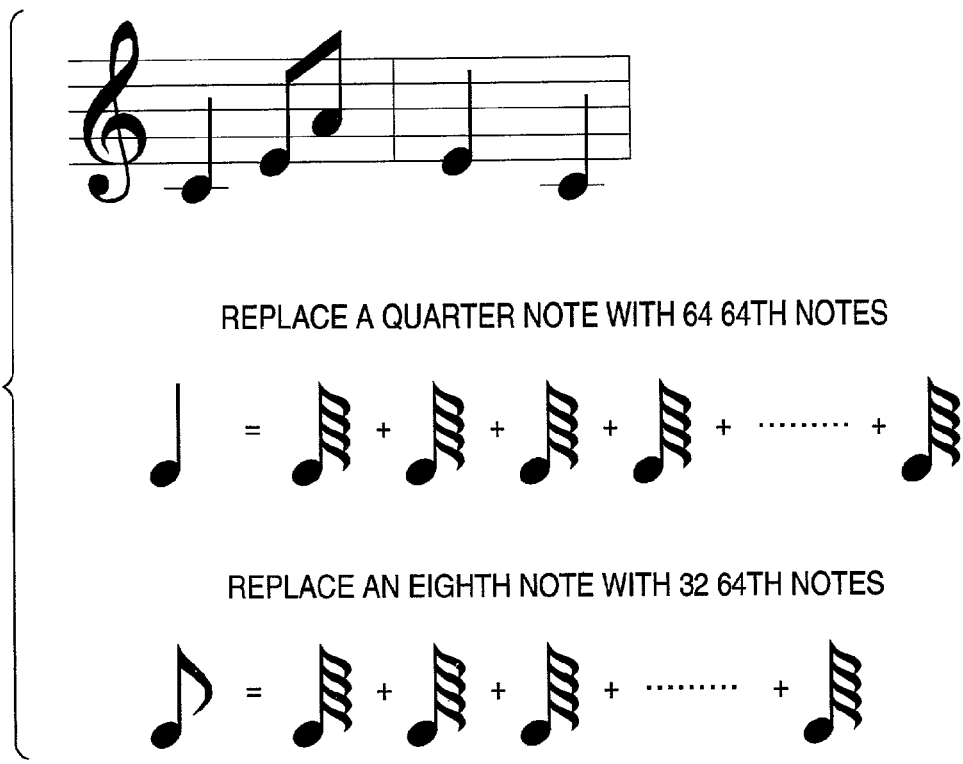
FIG. 4 is a diagram showing example music element data.

The 1/f information will now be described. FIG. 4 is a diagram showing example musical element data. The musical element data consists of two musical measures. The notes include quarter notes and eighth notes. In this embodiment, while a resolution of one measure is defined as 256, a quarter note is replaced by 64 continuous 64th notes, and an eighth note is replaced by with 32 continuous 64th notes. Since a person can not produce 64th note tones using an musical instrument, a synthesizer is employed to release the tone produced by a 64th note. When one note is replaced by 64th notes, the fluctuation for one note can be provided as described below, and when the fluctuation is provided, a sentimental feeling or another feeling can be imparted to the music.

Figure 5:
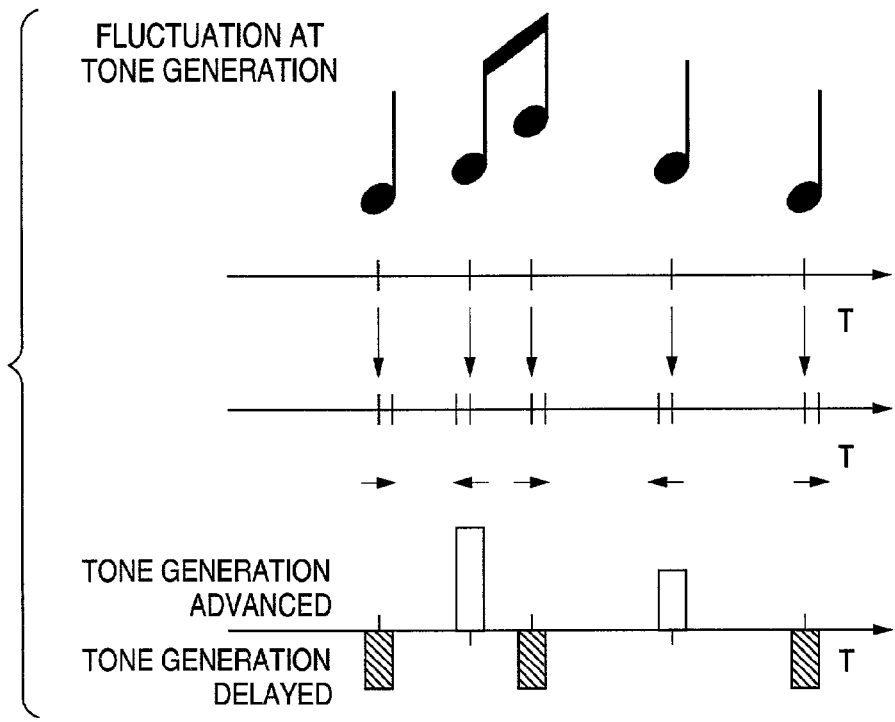
FIG. 5 is a diagram for explaining the process for providing a fluctuation for the beginning of a sound.

FIG. 5 is a diagram for explaining the provision of the fluctuation at the beginning of a tone. In the musical element data, a quarter note is placed at the beginning, followed by two eighth notes and two quarter notes. In this example, tone generation by the first quarter note is delayed by a time equivalent to two 64th notes, the tone generation by the next eighth note is advanced by a time equivalent to four 64th notes, the tone generation by the succeeding eighth note is delayed by a time equivalent to two 64th notes, the tone generation by the succeeding quarter note is advanced by a time equivalent to two 64th notes, and the tone generation by the next quarter note is advanced by a time equivalent to two 64th notes. As a result, the total of the delays offsets the total of the advances in the overall musical element data. The information as to a note in musical element index data and the period of delay or advance thereof is provided as fluctuation information for the tone generation, i.e., 1/f fluctuation information, in the musical element index (FIG. 2) that corresponds to the musical element data having a logarithmic scale relative to the time space.

Figure 6:
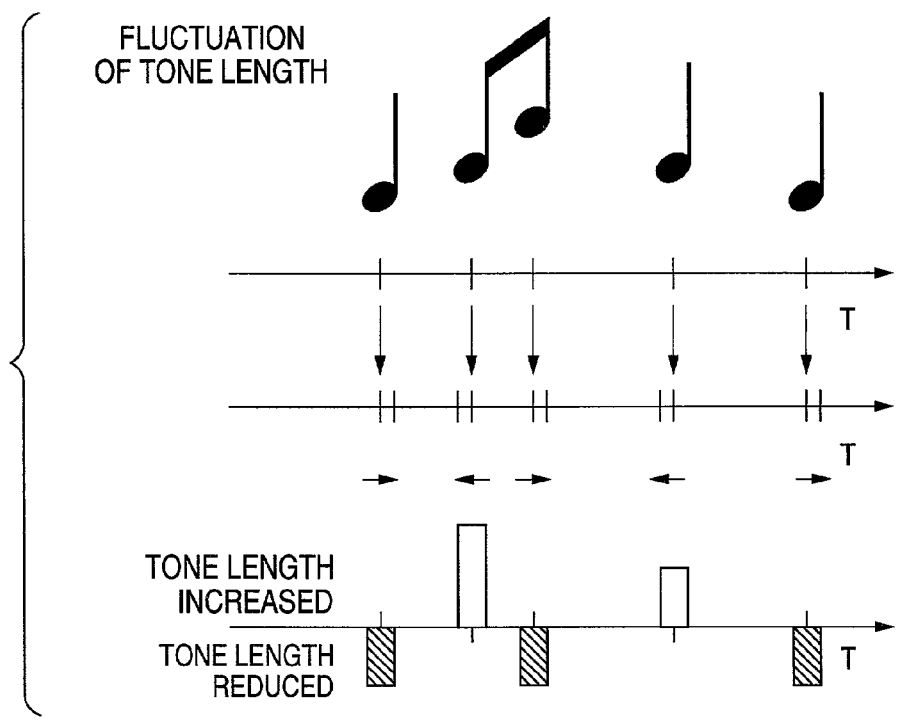
FIG. 6 is a diagram for explaining the process for providing a fluctuation for the length of a sound.

FIG. 6 is a diagram for explaining the provision of fluctuation for the length of a tone. In this example, the tone length for the first quarter note is reduced by a length equivalent to two 64th notes, the tone length for the next eighth note is increased by a length equivalent to four 64th notes, the tone length for the succeeding eighth note is reduced by a length equivalent to two 64th notes, the tone length for the succeeding quarter note is increased by a length equivalent to two 64th notes, and the tone length for the next quarter note is reduced by a length equivalent to two 64th notes. As a result, the total of length reductions offsets the total of the length increases in the overall musical element data. Information relative to a note in the musical element index data and the increase or reduction in the length thereof is provided as fluctuation information for the tone length, i.e., 1/f fluctuation information, in the musical element index (FIG. 2) that corresponds to the musical element data.

When the 1/f fluctuation designation button switch is prepared on the reactor process screen, and when the "fluctuation at the beginning of tone generation" or "fluctuation for the tone length" button is depressed, the harmonic relationship between two musical element indexes that have met in the processing tank in the reactor process is determined, while taking into account the 1/f fluctuation information in the musical element indexes corresponding to the depressed button. That is, the 1/f fluctuation information is reflected as the element of the n-dimensional vector of each musical element index.

The 1/f fluctuation is also used to generate new musical element data from one set of musical element data. This is because the impression differs when the musical element data without 1/f fluctuation and the musical element data with 1/f fluctuation are listened to. That is, even when "moderate" is represented by data representing sensory information (FIG. 2) in the musical element indexes of the musical element data without 1/f fluctuation, the musical element data with the 1/f fluctuation may be music for providing an "uneasy" rather that a "moderate" feeling. In this case, even though the same two measures are employed, different musical element data that include the musical element indexes are obtained. Therefore, multiple sets of new musical element data can be obtained by providing a variety of 1/f fluctuations for a single set of musical element data, and the range of the music that is automatically generated is extended.

Figure 7:
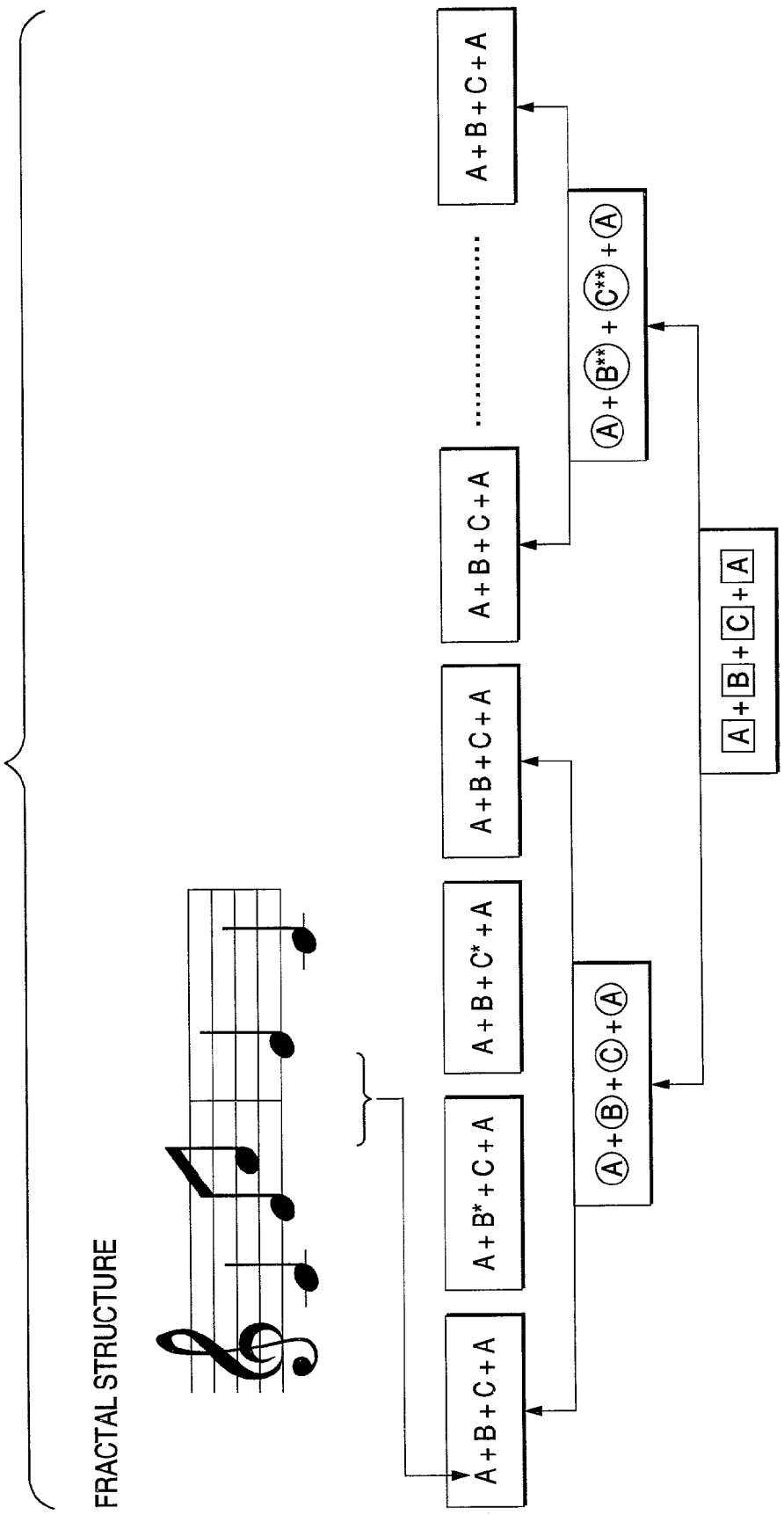
FIG. 7 is a diagram for explaining fractal information in a music element index.

FIG. 7 is a diagram for explaining the fractal information in FIG. 2. The term "fractal" means the repetition of the same structure from a small structure to a large structure. For example, for a scenario used for a second embodiment that will be described later, when a story has an "introduction, development, turn and conclusion" structure, a smaller story having an "introduction, development, turn and conclusion" structure is included in the "introduction" portion, in the "development" portion and in the "conclusion" portion, and there is another and smaller story having an "introduction, development, turn and conclusion" structure in the smaller "introduction" portion.

The same thing can be applied for music. Assume that music A, B and C, consisting of two measures each, are linked together to form eight musical measures, "A+B+C+A", and that a fractal structure is provided where the same structure is repeated while changing one part of the music, such as B→B$^+$ and C→C$^+$, in many cases, pleasant music can be provided. For example, eight measures of music, "A+B+C+A", can be produced by coupling together musical pieces A, B and C, each of which is two measures. At this time, the musical information sets included in the musical pieces of two measures each are also coupled together, and a musical information string of eight measures is generated. Then, the eight measures of music, "A+B+C+A", is regarded as a single musical piece, and is modified using the musical information string. The obtained eight measure musical pieces are defined as "A+B+C+A"/A, "A+B+C+A"/B and "A+B+C+A"/C. When these musical pieces are coupled together, 32 measures of fractal music, "A+B+C+A"/A+"A+B+C+A"/B+"A+B+C+A"/C+"A+B+C+A"/A, can be produced. Thus, a switch for designating the fractal structure for automatically generated music is prepared on the reactor process screen. Further, information representing that musical element data that is placed at the head of the music, in the middle of the music or at the end the of music (e.g., the A, B or C information) is written as fractal information for each of musical element index, so that the musical element index string of the fractal structure can be generated in the processing tank for the reactor process. Therefore, when the switch for using the fractal information is depressed before the reactor process, the fractal information is used as an element for the n-dimensional vector, and the harmonic relationship existing between the musical element indexes is determined.

As was explained while referring to FIG. 2, the column for entering chaos information is also provided for the musical element index. Chaos information is information for the chaotic changing of music, and is employed, for example, for a case wherein modulation is performed in the middle of a musical piece. In this case, since modulation that is not musically available based on the musical element data can not be performed, limiting information is employed as chaos information, and a switch for using the chaos information is provided. When the switch for using the chaos information is depressed, music including a chaotic element is automatically generated.

The musical element index information in FIG. 2 can be regarded as hereditary information in the genetic algorithm. Thus, for example, specific information in a specific musical element index can be replaced by other information in another musical element index, or by information obtained by adding two information elements together and dividing the results by two, to generate a new musical element index. Of course, electronic musical information (MIDI information) corresponding to the new musical element index is not present. However, when in the reactor for a specific musical element index does not correspond to a musical element index that is harmonically related, a new musical element index generated by the musical element index and any other musical element index that was encountered may be employed. In this case, a musical element index string wherein MIDI data is missing from a specific portion is output as music. At this time, a creator who desires to automatically generate music must produce music (musical element data) corresponding to the missing musical element index, or must ask an expert to produce the music.

In this embodiment, automatic music generation has been explained. For the automatic scenario production performed in the following, second embodiment, since the structure of a scenario element index is similar to that of a musical element index in FIG. 2 (unique information for a scenario is employed in FIG. 2 instead of musical information, and other information, such as 5W1H information and sensory information, is employed in the same way), the musical element index, for which the same information is provided in the portion used in common with the scenario element index, can be employed to automatically generate a background for a scenario that is automatically produced.

Second Embodiment

A system for automatically generating a scenario will now be described. The basic idea on which this system is based is the same as the one used for automatic music generation in the first embodiment. Scenario element data sets are stored in a database, and a scenario element index is added to each set of scenario element data. For musical element data, at least two measures are used, and musical element data having too many measures is not employed. However, for scenario element data, since each scene consists of a scenario element, as is shown in FIGS. 8A and 8B, there is not only a scenario element for only a single line or a scenario element for several lines, but also a scenario element that is provided for several pages.

Figure 9:
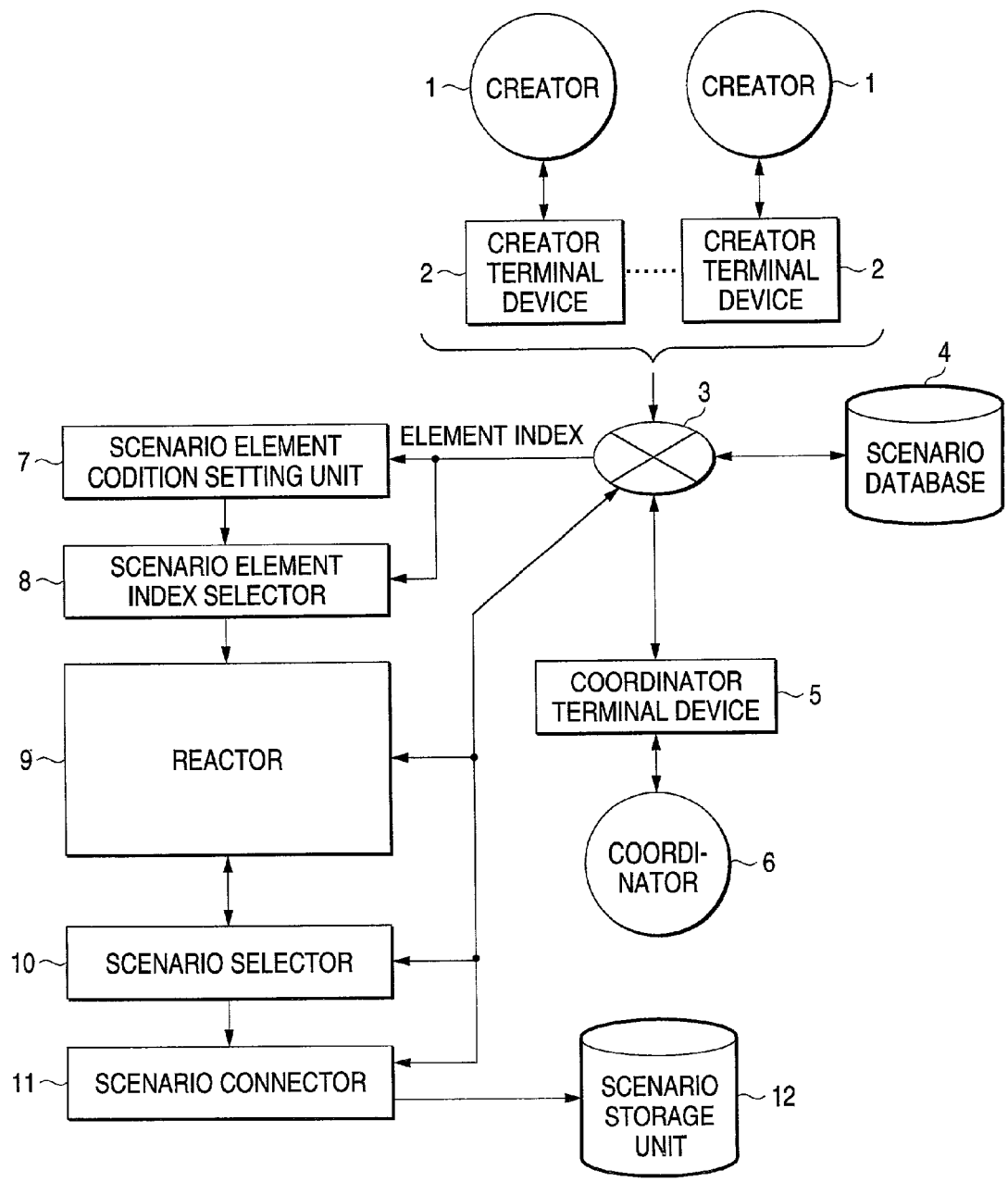
FIG. 9 is a block diagram showing the general configuration of a scenario production system according to a second embodiment of the invention.

FIG. 9 is a block diagram showing the general structure of a scenario creation system according to the second embodiment of the invention.

The scenario creation system of this embodiment comprises: a creator terminal device 2, for entering and requesting the registration of an original scenario draft or an original scenario element that is prepared by a creator 1; and a coordinator terminal device 5, which is connected to the creator terminal device 2, via a computer network and/or a communication network (hereinafter referred to as a communication network). A coordinator 6 employs the coordinator terminal device 5 to examine and approve, in accordance with references provided for the system, the original scenario draft or the original scenario element that the creator 1 prepared, entered and requested be registered. Further, the scenario creation system comprises: a scenario element/scenario element index database 4 (hereinafter referred to as a scenario database) that serves as a storage means. The original scenario draft or the original scenario element that is approved by the coordinator 6 is edited to obtain a scenario element and a scenario element index, which are registered/stored as a database in the scenario database 4.

In addition, the scenario creation system comprises: a scenario element condition setting unit 7 and a scenario element index selector 8. The scenario element condition setting unit 7 designates a condition for a scenario element that the creator 1 and/or the coordinator 6, who is the scenario writer for this system, desires to prepare by using the creator terminal device 1 and/or the coordinator terminal device 5. The scenario element index selector 8, which corresponds to extraction means, selects a scenario element index from the scenario database 4 in accordance with the designated scenario element condition. Furthermore, the scenario creation system comprises: a reactor 9 and a scenario selector 10. The reactor 9, which corresponds to agitation means, exchanges data with the scenario database 4 via the communication network 3, and employs computer simulation procedures to perform the agitation process during which the scenario element indexes output by the scenario element index selector 8 are agitated in accordance with a pseudo physical rule. When the reactor 9 generates and outputs a new set of scenario element indexes, accompanied by a synopsis that is prepared to facilitate the understanding of the schematic contents of these indexes, and when a predetermined time has elapsed, the scenario selector 10 selects the output of the reactor 9 in accordance with a determination, made by the creator 1 and/or the coordinator 6, that is transmitted to the creator terminal device 2 and/or the coordinator terminal device 5, either via the communication network 3, or at the time the reactor 9 output the new set of scenario element indexes.

Moreover, the scenario creation system comprises: a scenario connector 11 and a scenario storage unit 12. The scenario connector 11, which corresponds to the recovery means, the scenario linking means and the editing means, connects and edits scenario elements, which correspond to the scenario element indexes that are passed by the scenario selector 10, and recovers one scenario. Following which, the scenario storage unit 12 stores a scenario output by the scenario connector 11. In this embodiment the scenario element condition setting unit 7, the scenario element index selector 8, the reactor 9, the scenario selector 10, and the scenario connector 11 are constituted by software programs that are loaded as applications into the creator terminal device 2 or the coordinator terminal device 5.

Generally, a plurality of creators 1 prepares a plurality of scenario drafts in which a scenario to be created is divided into elements for individual scenes (corresponding to one original animated movie). Thereafter, the obtained scenario drafts are transmitted, via the communication network 3, to the coordinator terminal device 5. Instead of transmitting the scenario drafts, the scenario elements extracted from the scenario drafts can be transmitted, via the communication network, to the coordinator terminal device 5. In this embodiment, the creator 1 and the coordinator 6 are collectively called the creator.

A scenario element is the basic unit constituent of a scenario that is obtained for each scene of a draft scenario, or by dividing the contents of a scenario by a minimum unit, such as a short unit time. The scenario element is paired with a corresponding scenario element index that represents the contents of the scenario element, and the two, the scenario element and the scenario element index, are stored in the scenario database 4. The scenario element indexes include entries that are appropriate for the settings for WHEN, WHERE, WHO, WITH WHOM, WHAT AND HOW, which are elements extracted in accordance with the 5W1H rule that represents the condition setting of the scenario elements, and entries, such as adjectives and adjective verbs, that are added in accordance with the contents of the scenario elements.

The scenario elements are a set of parameters for setting a required condition when the reactor 9 performs, for the agitation process, a computer simulation for agitating the scenario element indexes in accordance with the pseudo physical rule. In this embodiment, when the scenario index is regarded as a physical entity represented by a vector, the parameters are the direction of movement and the speed of the physical entity (a mass point), and the growth level (nutrition level) that is defined for determining the life span of the scenario element indexes. The growth level (nutrition level) may be regarded as the mass of the physical entity (the mass point), and therefore, the scenario element may be regarded as a vector representing the setting condition for scenario creation when the reactor 9 agitates the scenario element indexes, including the entries that represent the contents of the corresponding scenario elements.

At the speed included in the parameters for the scenario element, the scenario element index moves forward, in the direction established by a parameter, in an agitation container for which the predetermined shape and size are defined by the reactor 9. Furthermore, during the agitation process, the individual parameters are changed in accordance with a condition that will be described later.

In this embodiment, genetic algorithms are employed by the reactor 9 during the agitation process. However, as presented above as a pseudo physical rule, a computer simulation performed by the reactor 9 is not a simulation of the processing performed by a complete physical phenomenon, and an arbitrarily defined rule may be employed. Therefore, at the time at which the scenario element index collides with the barrier of the agitation container, the reflection angle (new direction), for example, can be arbitrarily designated.

Individual original scenario drafts, or original scenario elements prepared by the creator 1 are transmitted, via the communication network 3, to the scenario database 4, and are temporarily stored in a special temporary database. After the original scenario drafts or the scenario elements have been transmitted and temporarily stored, the coordinator 6 fetches the drafts or elements to the coordinator terminal device 5, and examines and approves them in accordance with the references provided for the system. Then, the original scenario drafts or the original scenario elements that have been approved are edited, and the results are transmitted, via the communication network 3, to the database 4, where they are registered. As a result, the scenario elements and the scenario element indexes are finally stored in the database.

Figures 10, 11:
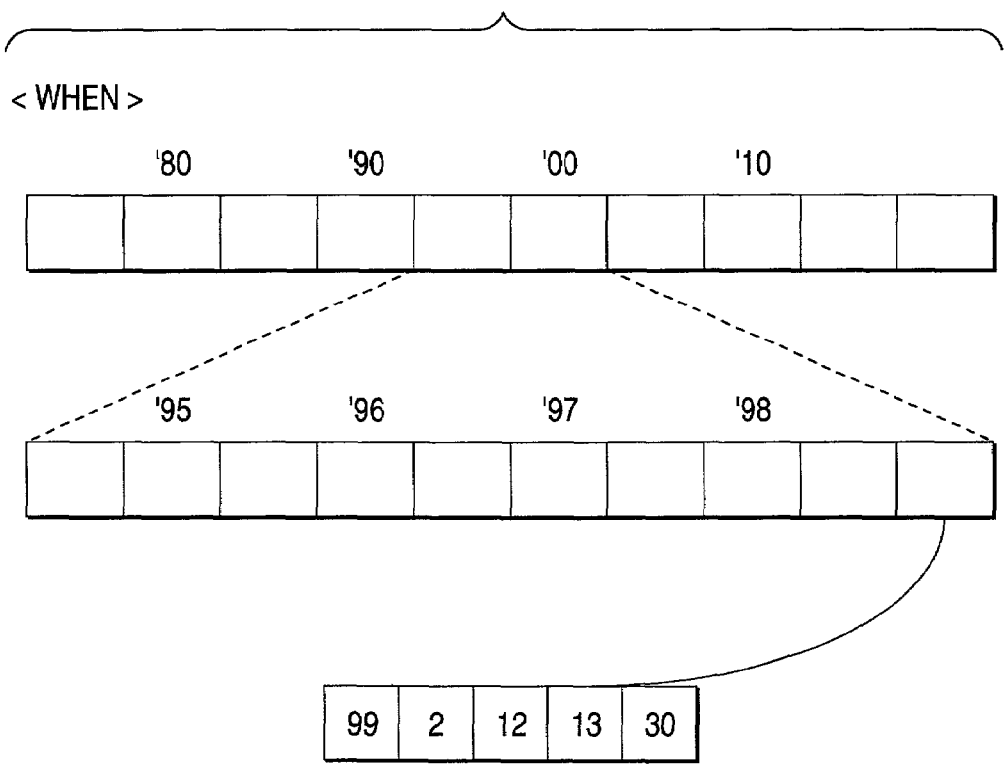
FIG. 10 is a diagram for explaining the numerical expression for an entry corresponding to WHEN that is included in the scenario element index for the scenario production system according to the second embodiment.
FIG. 11 is a diagram for explaining the numerical expression for entries that correspond to WHO and WITH WHOM included in the scenario element index for the scenario production system according to the second embodiment.
Figure 12A:
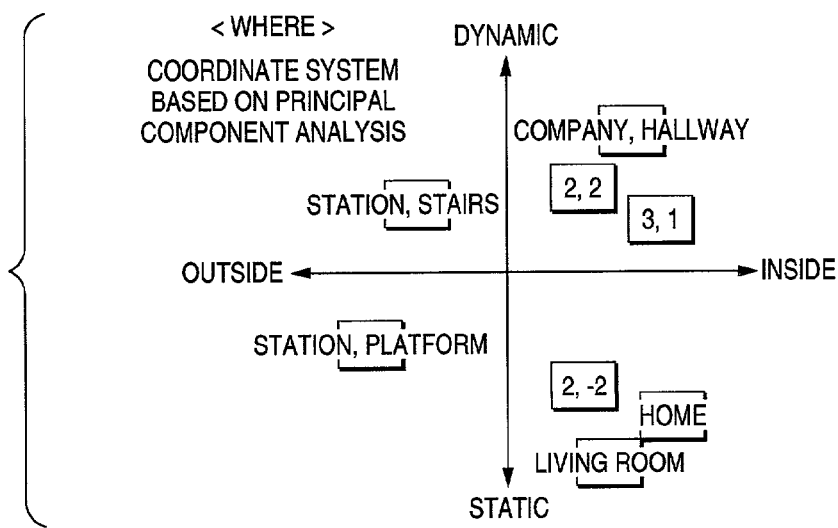
FIG. 12 is a diagram for explaining the numerical expression for entries corresponding to WHERE, WHAT, HOW, and an adjective and an adjectival verb included in the scenario element index for the scenario production system according to the second embodiment.
Figure 12B:
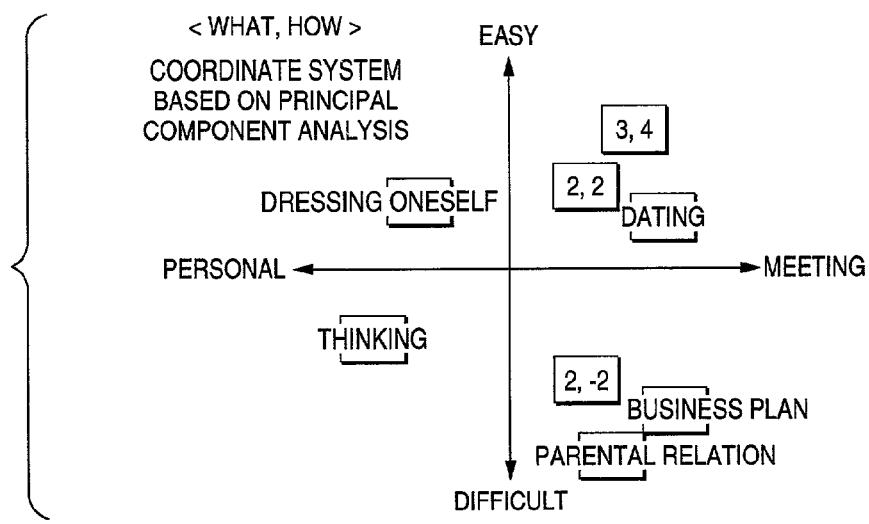
Figure 12C:
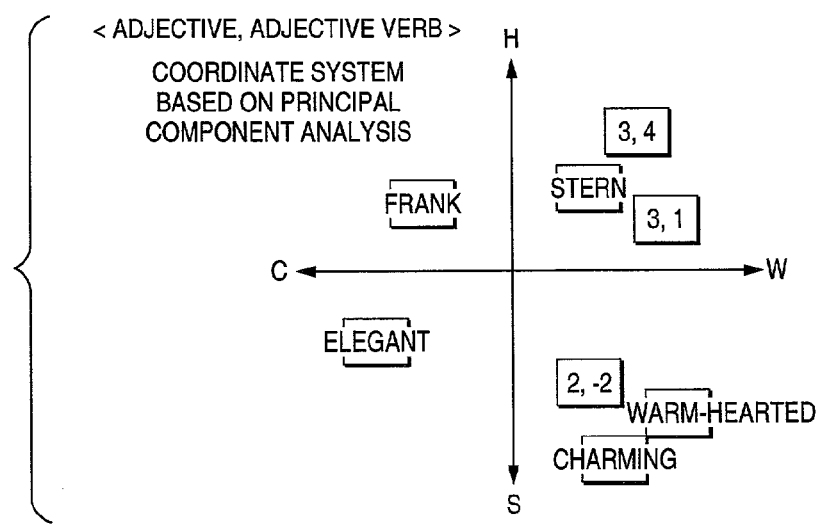

Then, the individual entries included in the scenario element indexes are replaced, as the parameters of the scenario elements, by numerical data, and the numerical data are stored. As is shown in FIG. 10, an entry that corresponds to WHEN in 5W1H is represented by coordinates along a one-dimensional time axis. Further, as is shown in FIG. 11, for entries that correspond to WHO and WITH WHOM in 5W1H, such information as the relationships existing among the characters are represented by numerical values. Then, as is shown in FIG. 12A, for an entry that corresponds to WHERE in 5W1H, principal component analysis is performed based on an attribute related to whether the location indicated by a pertinent scenario element is dynamic or static, or inside or outside, and the result is used by the two-dimensional coordinate system to represent spatial coordinates. As is shown in FIG. 12B, for entries that correspond to WHAT and HOW in 5W1H, principal component analysis is performed for the contents indicated by a pertinent scenario element, in accordance with evaluation elements (easiness, difficulty, etc.) that are designated requirements for the creator 1 and the coordinator 6, and the result is presented as spatial coordinates by the two-dimensional coordinate system. As is shown in FIG. 12C, for entries that correspond to an adjective and an adjective verb, as well as for WHERE, principal component analysis is performed for an attribute that indicates the property of the pertinent entry. And the result is presented by the two-dimensional coordinate system as the spatial coordinates.

The scenario element condition setting unit 7 designates parameters that constitute the condition for the scenario elements, and the scenario element index selector 8 selects a scenario element index in accordance with a scenario element selection reference corresponding to the scenario condition setting. At this time, the direction of movement and the speed, and the growth level (nutrition level) that are included in the parameters are determined at random, and the scenario element condition setting unit 7 is included in the reactor 9.

Thereafter, the scenario element index selector 8 sequentially reads the scenario element indexes stored in the scenario database 4, and selectively outputs them in accordance with a scenario element selection reference that was set in advance. The scenario elements election reference is a setting reference, corresponding to the condition setting for the scenario elements, that is provided in order to select the scenario element indexes (or more specifically, information for the macro condition of a scenario, which is represented in accordance with the 5W1H principle, and information that additionally includes an adjective, an adjective verb, and the natures of characters and their relationships). Generally, the setting reference is determined by the coordinator 7, while acting as the main producer; however, the setting reference may be discussed and determined by the creator 1 and the coordinator 6.

Among the entries that are included in the scenario element indexes selected by the scenario element index selector 8, the correlation level of an entry that corresponds to the scenario element selection reference is obtained. At this time, the location of each corresponding entry along a one-dimensional time axis, its location along a two-dimensional spatial axis produced through principal component analysis, its matching of an adjective and an adjective verb, and its matching points with the natures of characters and the relationships within the characters are employed to calculate the correlation level. That is, in the two-dimensional spatial coordinate system produced by principal component analysis, the distance between the location of the entry of the pertinent scenario element index and the location of the entry of the scenario element selection reference is calculated, and the correlation value of the scenario element index for each entry is represented by this distance while the correlation level is determined based on this correlation value.

A predetermined obstacle condition is designated in advance for the reactor 9 in order to limit the movement of the scenario element index. Further, a nutriment (bait) to be added to the growth level, which is one of the scenario element parameters, is arranged in advance (this will be described later in detail).

When a predetermined number of scenario element indexes have been formed by the scenario element condition setting unit 7, for a predetermined period of time the reactor 9 performs the computer simulation of the agitation process to agitate these indexes in accordance with the pseudo physical rule.

In this case, the pseudo physical rule is employed instead of the normal physical rule because when a scenario element index has collided with another scenario element index, or with a barrier or an obstacle determined by the reactor 9, the speed and the angle of the scenario element index following the collision may be determined at random.

The agitation process may include, for example, <replacement>, <generation (birth)>, <erasing> and <rearrangement (linking and arranging)> processes.

During a <replacement> process, when two scenario element indexes collide, the entries included in the two are replaced in accordance with a correlation level, and a specific method to be used for the replacement is determined in accordance with a predetermined rule in consonance with the combination of the two scenario element indexes.

During a <generation (birth)> process, when two scenario element indexes collide, a new scenario element index is generated. At this time, a scenario element that corresponds to the new scenario element index is obtained by the reactor 9 issuing a preparation request, via the communication network 3, to the creator 1.

During an <erasing> process, the scenario element index in the reactor 9 for the growth level of a parameter that has reached zero is erased. It should be noted that, when the scenario element index has encountered a nutriment (bait), the growth level of the parameter is incremented by a value (including a negative value) equivalent to an increase determined by the nutriment (bait). The growth level is also reduced at a predetermined rate as time elapses.

During a <rearrangement (linking & arranging)> process, when two scenario element indexes collide a correlation level between the entries included in the two is calculated. And when a predetermined correlation level is reached, the entries included in the two scenario element indexes are connected in parallel to form a new scenario element index. At this time, the order of the scenario element indexes to be linked in parallel, and the direction of movement and the speed of the new scenario element index are determined by a predetermined relationship (e.g., a time relationship for the entry WHEN) between specific entries in the original two scenario element indexes. Subsequently, the growth level of the new scenario element index can be set as the sum of the growth levels of the two scenario element indexes that collided.

The scenario selector 10 selectively outputs the processing results obtained by the reactor 9 (a plurality of scenario element indexes obtained following simulation) when a predetermined time has elapsed since the computer simulation of the agitation process was begun. The subjective determination provided by the creator 1 and/or the coordinator 6 that examines the results output by the reactor 9 is employed as the scenario evaluation reference for the selective output. The determination reference may be set and input in advance via the communication network 3.

When the output of the reactor 9 (multiple scenario element indexes arranged in order) does not clear the scenario evaluation reference, the agitation process performed by the reactor 9 is repeated. The time required by the reactor 9 to perform the agitation process can be arbitrarily set in advance.

The scenario connector 11 recovers and connects together a set of multiple scenario elements corresponding to a set of multiple scenario element indexes that were selectively output by the scenario selector 10, and generates one scenario. The connection order is not always the same as the output order employed by the scenario selector 10, and can be arbitrarily set by the creator and/or the coordinator 6. Further, an edition process is performed for employing a predetermined table to replace fixed phrases in scenario elements of the obtained scenario. Through this processing, the names of the individuals in the cast that appear in the scenario are appropriately changed and edited, so as to match the overall flow of the scenario.

The scenario storage unit 12, which may be connected to the scenario connector 11 via the communication network 3, stores the scenario output from the scenario connector 11.

FIGS. 13 to 17 are diagrams for explaining the data structure of a scenario element index (including a parameter for a scenario element used in the agitation process), and the processing performed by the reactor 9 in accordance with the scenario creation system of the invention.

Figure 13:
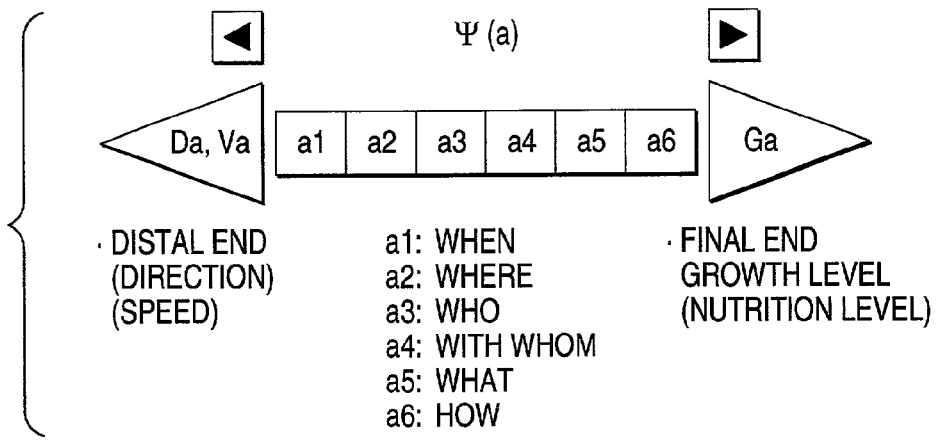
FIG. 13 is a diagram for explaining the data structure of the scenario element index for the scenario production system according to the second embodiment.

In the data structure of the scenario element index in FIG. 13, a parameter Da, indicating the direction of a vector, and a parameter Va, indicating the speed, are added preceding entry data (a1 to a6) for the scenario element index concerning the 5W1H, while a parameter Ga, indicating the growth level (nutrition level), is added at the end of the entry data for the scenario element index. The direction and speed (strictly speaking, swiftness) parameters are those of a physical entity (mass point) represented by a vector, which is how the pertinent scenario element index is regarded. The parameter for the growth level (nutrition level) may be regarded as the mass of the physical entity.

Figure 14:
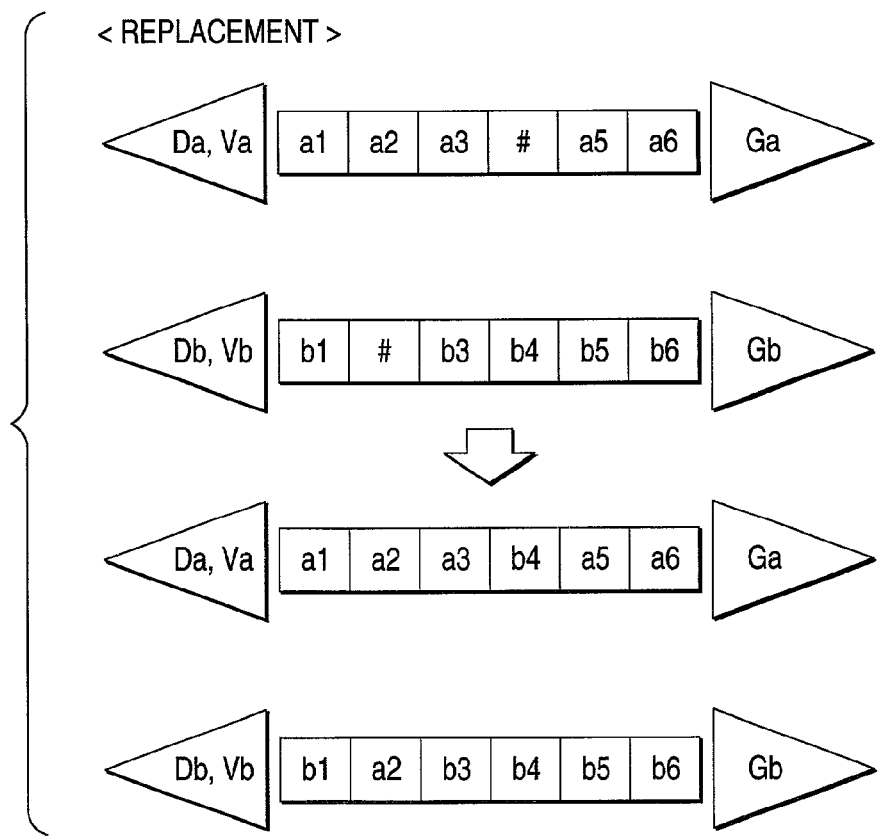
FIG. 14 is a diagram for explaining the replacement process performed by a reactor in the scenario production system according to the second embodiment.

During the <replacement> process in FIG. 14, as a result of a collision between the two scenario element indexes whose parameters for the direction of movement and speed are (Da, Va) and (Db, Vb), several of the entry data (a1 to a6) or (b1 to b6) are replaced by using data entries obtained from the other index.

Figure 15:
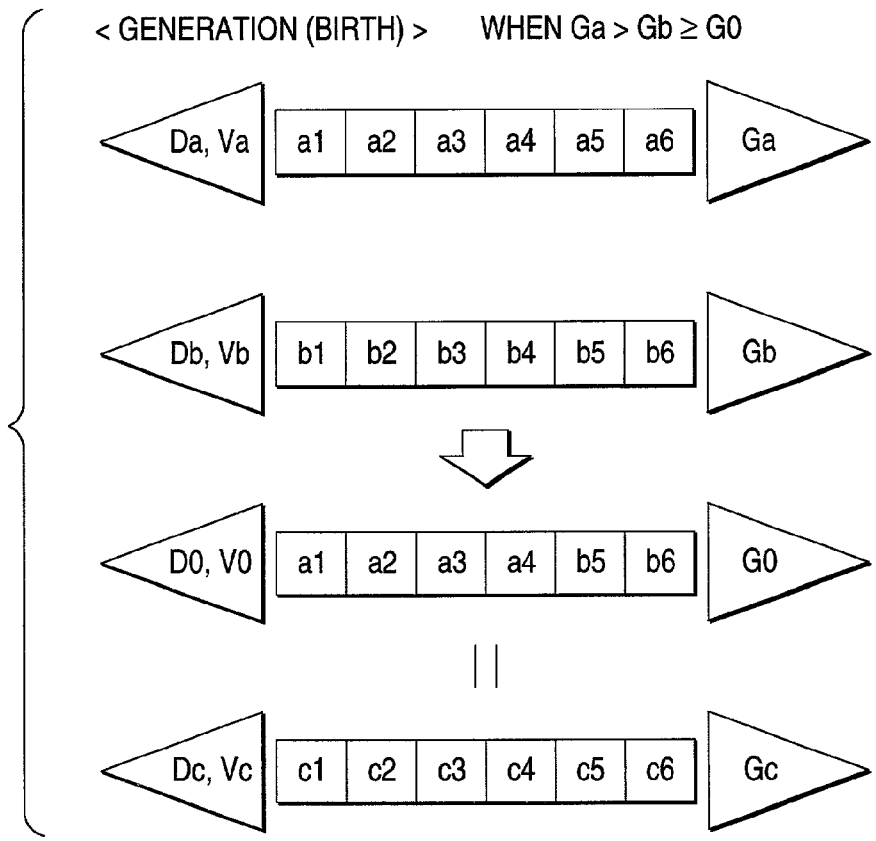
FIG. 15 is a diagram for explaining the generation process performed by the reactor in the scenario production system according to the second embodiment.

During the <generation (birth)> process in FIG. 15, as a result of a collision between the two scenario element indexes whose parameters for the direction of movement and speed are (Da, Va) and (Db, Vb), a new scenario element index is generated. The parameters (Dc, Vc) and the entry data (c1 to c6) of the new scenario element index are generated based on the parameters (Da, Va) and (Db, Vb) and the entry data (a1 to a6) and (b1 to b6) of the original scenario element indexes. A scenario element, which corresponds to the new scenario element index and which is prepared by the reactor 9 issuing a request to the creator 1 and/or the coordinator 6 via the communication network 3, is stored in the scenario database 4.

Figure 16:
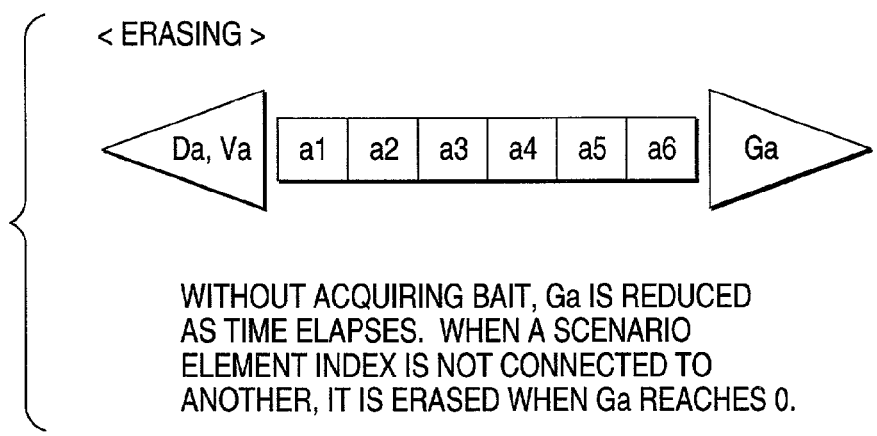
FIG. 16 is a diagram for explaining the deletion process performed by the reactor in the scenario production system according to the second embodiment.

In the <erasing> process in FIG. 16, while Ga is the parameter of the current growth level (nutrition level) of the scenario element index that has the parameters (Da, Va) of the direction of movement and speed, when the Ga reaches zero, there are a case for erasing the scenario element index and a case for reducing the parameter Ga.

Figure 17:
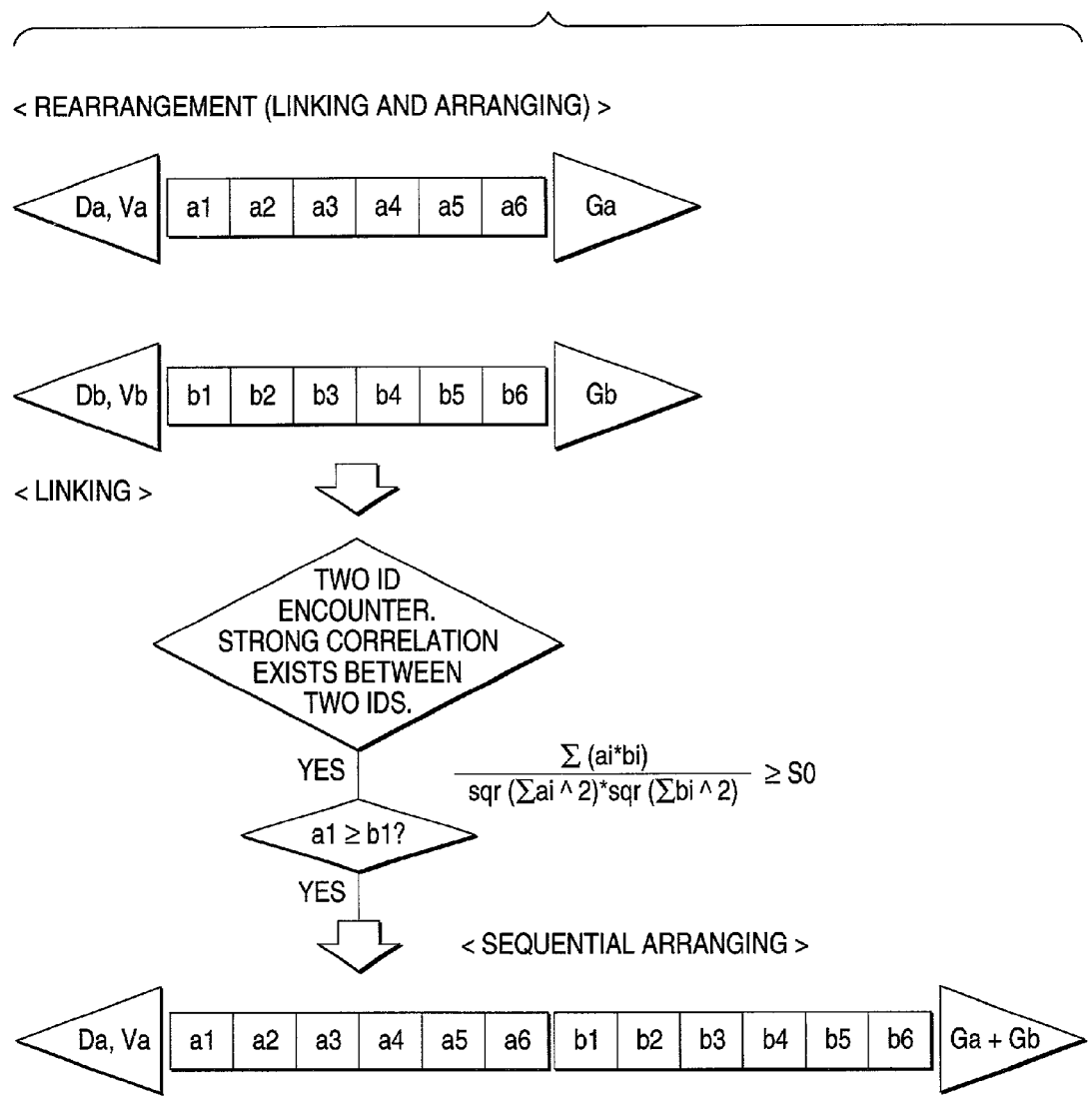
FIG. 17 is a diagram for explaining the rearrangement (linking and arrangement) process performed by the reactor in the scenario production system according to the second embodiment.

During the <rearrangement (linking & arranging)> process in FIG. 17, as a result of a collision between the two scenario element indexes whose parameters for the direction of movement and speed are (Da, Va) and (Db, Vb), the correlation level between the entry data (a1 to a6) and (b1 to b6) of the scenario element indexes is calculated by using a predetermined expression. When the obtained correlation level exceeds a predetermined value, the entry data included in the two scenario element indexes are combined to form one scenario element index. The direction of movement and the speed of the obtained scenario element index are determined by the relationship (the size relationship) between the entry data a1 and b1, and the growth level (nutrition level) of the obtained scenario element index is established as the sum of the growth levels (nutrition levels) of the two original scenario element indexes.

Figure 18:
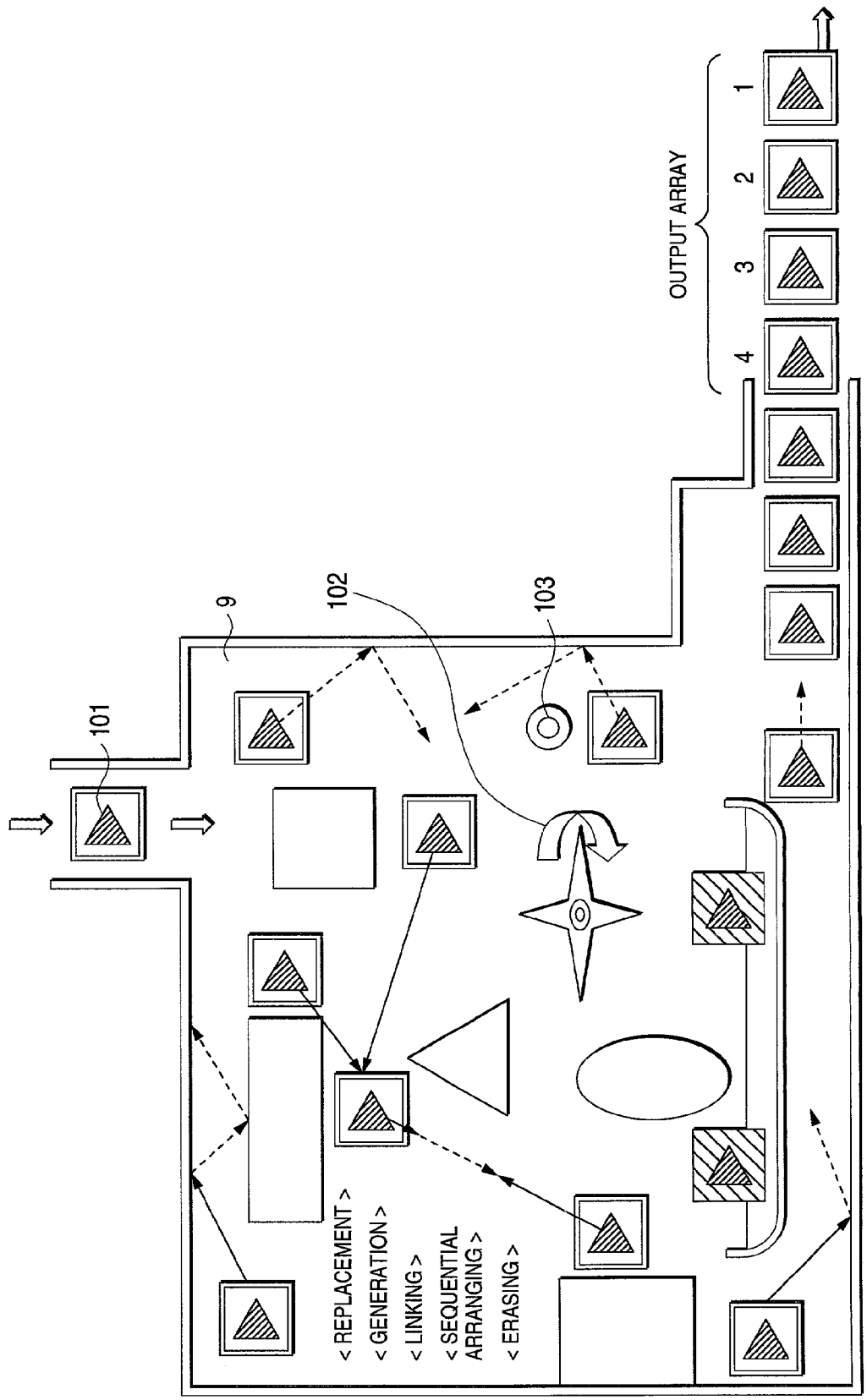
FIG. 18 is a diagram for explaining the physical image for the process performed by the reactor in the scenario production system according to the second embodiment.

FIG. 18 is a diagram showing the state of a physical image for the process performed by the reactor 9 of the scenario creation system of this embodiment.

Scenario element indexes 101 output by the scenario element condition setting unit 7 are sequentially supplied to the reactor 9. The reactor 9 counts the supplied scenario element indexes 101, and when the count reaches a predetermined number, the reactor 9 initiates the agitation process (the <replacement> process, the <generation (birth)> process, the <erasing> process and the <rearrangement (linking and arranging)> process).

As the parameters for determining the starting point for the agitation process, the initial location and a predetermined value for the scenario element index count are transmitted in advance to the reactor 9 by the creator 1, and/or the coordinator 6, via the communication network 3. These parameters are then employed for the reactor 9 setup. It should be noted that a predetermined value for the scenario element index count may be stored as a fixed value in the reactor 9, for which an obstacle condition 102, for example, is set in advance and as the location of a nutriment (bait) 103. The obstacle condition may include information, such as a condition for desired scenario contents, that is set in advance by the creator 1 and/or the coordinator 6. Thus, due to the initial setting of the obstacle condition, the agitation process does not provide output results that are produced completely at random, and the contents of a set of scenario element indexes obtained through the computer simulation, i.e., the contents of the scenario obtained by linking the corresponding scenario elements, can be determined to a degree (e.g., a specific scenario element index is always included).

Figure 19:
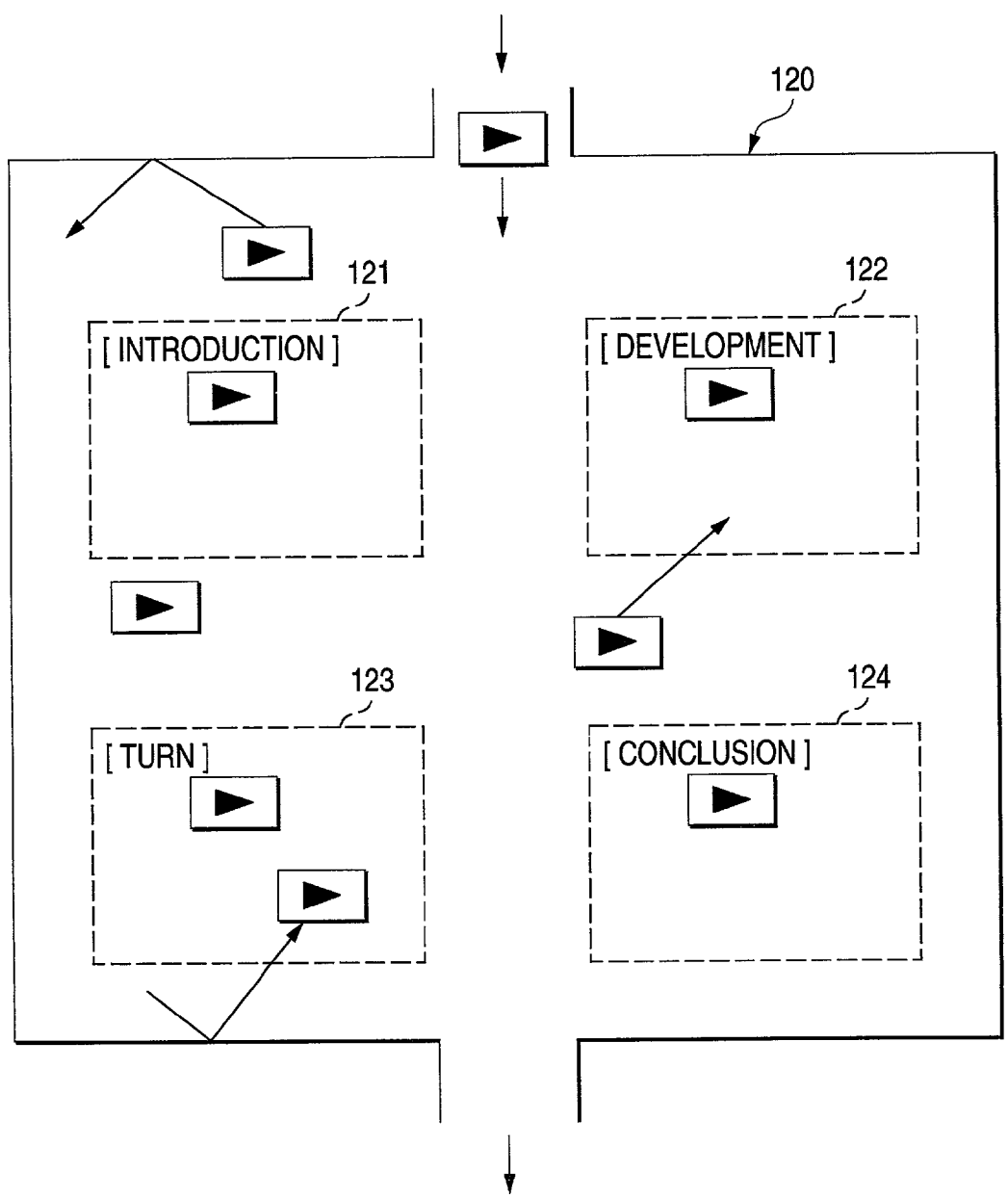
FIG. 19 is a diagram for explaining another example process performed by the reactor in the scenario production system according to the second embodiment.

An explanation will now be given for another example computer simulation for agitation processes that are performed separately for "introduction", "development", "turn" and "conclusion", which form an example scenario pattern. FIG. 19 is a diagram for explaining another example of the processing performed by a reactor in accordance with a scenario creation system.

In a reactor 120, storage boxes 121, 122, 123 and 124, which correspond to the scenario portions "introduction", "development", "turn" and "conclusion", are provided that constitute the pattern of the scenario. Initially, stored in each storage box is a suitable scenario index, which is based on a scenario element selection reference that is designated by the creator 1 and/or the coordinator 6, or which is based on a story. Then, the computer simulation of the above described agitation process (the <replacement> process, the <generation (birth)> process, the <erasing> process, the <rearrangement (linking & arranging)> process) is performed, and the relevant scenario element indexes are collected from the individual storage boxes 121, 122, 123 and 124, either to be connected together or to be replaced by each other, or to generate a new scenario element index. As a result, a set of sequentially arranged scenario element indexes that correspond to the scenario portions "introduction", "development", "turn" and "conclusion" is generated and output by the reactor 120.

Since multiple scenario element indexes that correspond to those output by the reactor 120 are connected together, a scenario that matches the contents of a pattern that is set in advance can be prepared automatically. When the reactor 120 is employed, an agent function for automatically preparing a scenario having desired contents can be provided for the scenario creation system.

The operation performed by the scenario creation system of this embodiment will now be described while referring to FIGS. 9 to 18 and FIGS. 20 to 22.

Figure 20:
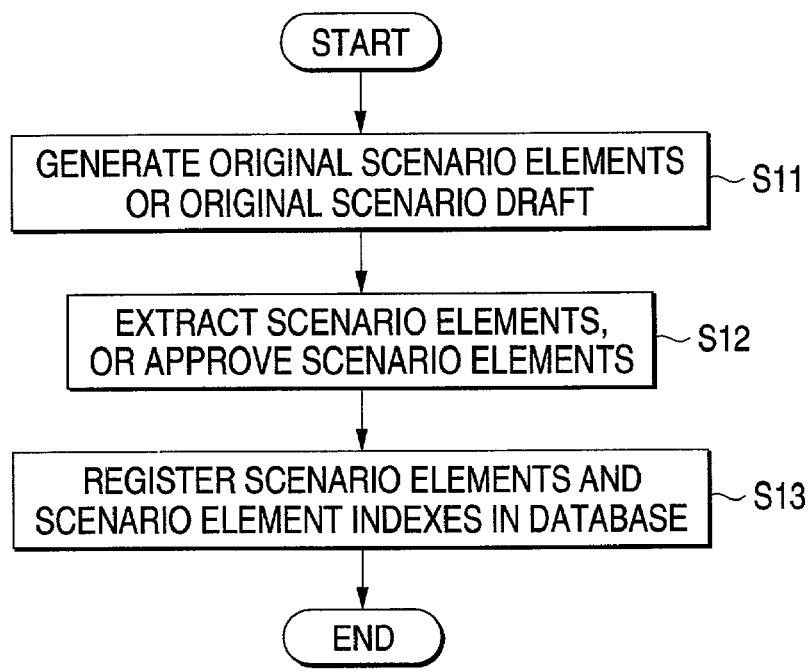
FIG. 20 is a flowchart showing the processing performed by the scenario production system according to the second embodiment when generating a scenario element and a scenario element index.
Figure 21:
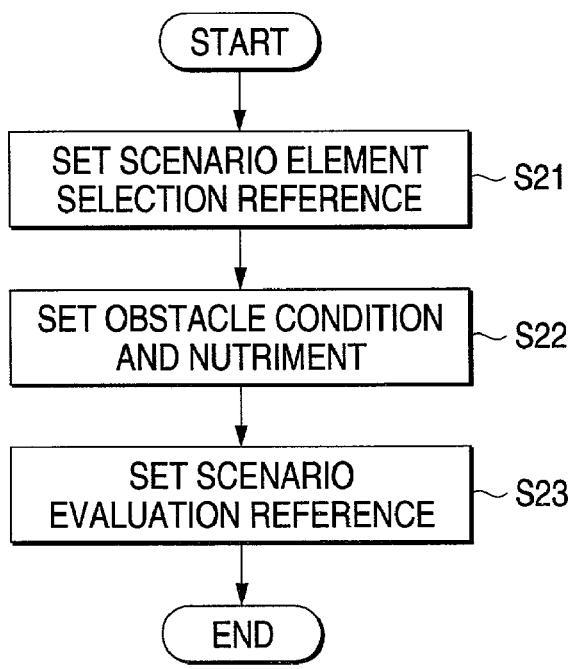
FIG. 21 is a flowchart showing the processing performed by the scenario production system according to the second embodiment when setting a simulation condition, a scenario element selection reference and a scenario evaluation reference.

FIGS. 20 to 22 are flowcharts showing the operation performed by the scenario creation system in accordance with the embodiment. The operation in FIG. 20 shows the processing performed to create a scenario element and a scenario element index. The operation in FIG. 21 shows the processing performed to set a simulation condition, a scenario element selection condition and a scenario evaluation reference. And the operation in FIG. 22 shows the processing performed to carry out the agitation simulation.

At step S11, the creator 1 either prepares a scenario draft or extracts a scenario element, which is a basic constituent, from a scenario draft, and transmits the scenario draft or the scenario element to the coordinator terminal device 5 via the communication network 3. At step S12, the coordinator 6 approves the scenario element received at the coordinator terminal device 5, and at step S13, the scenario element is stored and registered in the scenario database 4. At this time, in addition to the scenario element, a scenario element index corresponding to the scenario element and including entries concerning the 5W1H rule is prepared and registered. It should be noted that upon receiving the scenario draft the coordinator 6 extracts the scenario element from it and stores the scenario element, with an added scenario element index, in the scenario database 4.

At step S21, the scenario element selection reference is determined through a discussion held between the creator 1 and the coordinator 6, and via the communication network 3 and is used to set up the scenario element index selector 8. At step S22, the obstacle condition and the specification of a nutriment (bait) are determined through a discussion held between the creator 1 and the coordinator 6, and via the communication network 3 are used to set up the reactor 9. At step S23, the scenario evaluation reference is prepared through a discussion held between the creator 1 and the coordinator 6, and via the communication network 3 is used to set up the scenario selector 10. Instead of the scenario evaluation reference being used in advance for a setup, the creator 1 and/or the coordinator 6 may evaluate the results of the agitation process when the agitation simulation has been completed.

At step S31, the scenario element condition setting unit 7 designates the previously described parameters as the condition for the scenario element, and the scenario element index selector 8 sequentially reads the scenario element indexes from the scenario database 4 via the communication network 3. At step S32, a scenario element index is selected in accordance with the scenario element selection reference that includes the condition setting for the scenario. At step S33, the scenario element condition setting unit 7 adds the parameters for the scenario element required for the agitation simulation to the selected scenario element index, and transmits them to the reactor 9.

At step S34, the scenario element condition setting unit 7 sets the time for an agitation timer (not shown) for the execution of the agitation simulation. At step S35, the reactor 9 counts the input scenario element indexes, and when the number of them equals the predetermined count, the agitation simulation is performed. During the simulation, the agitation timer counts the elapsed time.

At step S36, a check is performed to determine whether the time counted by the agitation timer is equal to or greater than a predetermined elapsed time count, and when it is not, program control returns to step S35 to continue the agitation simulation.

When the predetermined time has elapsed, at step S37 a check is performed to determine whether the array of the scenario element indexes, or of the rearranged scenario element indexes, output by the reactor 9, satisfies the scenario evaluation reference. In this case, the evaluation is made in accordance with a subjective determination made by the creator 1 and/or the coordinator 6. If the array does not satisfy the scenario evaluation reference, program control returns to step S34 to again perform the agitation simulation.

At step S38, scenario elements that correspond to the scenario element indexes that are finally obtained are extracted from the scenario database 4 and are linked together to generate a single scenario. At step S39, the editing process, including the replacement, in accordance with a fixed table, of fixed phrases in the scenario elements of the obtained scenario, is performed, and thus, the creation of the scenario is completed.

The embodiment of the creator terminal device, the coordinator terminal device and the reactor in the scenario production system can be accomplished by using a personal computer. Further, the types of communication networks, such as computer networks, that can be used include the Internet.

As is described above, in this embodiment, based on the scenario elements, a scenario that corresponds to a desired setting can be semi-automatically produced through agitation simulation. Thus, a large number of scenarios can be easily produced and supplied by a small number of creators (e.g., one creator) within a short period of time, while the load imposed on the creators is dramatically reduced, resulting in a great savings in labor. For example, to produce animation for a broadcast, for multi-channels that employ BS digital broadcasting, a large amount of content can be produced and supplied by a only a few producers.

Further, since multiple scenario elements are stored in the database, the capabilities and creative results obtained by multiple creators are not wasted, and can be appropriately utilized, so that high quality content can easily be produced. Further, since in agitation simulation scenario element indexes are agitated at random, a different scenario can be obtained each time. Therefore, a scenario in which a story develops naturally and that varies to avoid stereotypes can be semi-automatically produced.

As is described above, according to the embodiment, a scenario can be semi-automatically produced in accordance with a desired setting, so that while a savings can be realized in the labor and effort required of a creator, a large scenario can be easily produced within a short period of time.

Third Embodiment

An explanation will now be given for the generation of an original picture element, such as animation, and the automatic production process, employed for an original picture string, that in the second embodiment automatically generated a story in accordance with the development of a scenario.

FIG. 23 is a diagram showing an example process for the generation of original picture elements. For example, to produce original picture elements for a smiling person, programs are prepared as is shown in FIG. 23A, so that, when to smile one part (e.g., a mouth) of a body is moved, and accordingly, another part is interactively moved, the natural movement of the individual parts is produced. These programs are moved interactively, and when one part of the body is moved, as is shown in FIG. 23B, the program for moving a "face" forms a facial expression, the program for moving the "trunk of a body" moves the trunk, and the program for moving the "left leg" moves the left leg to form a moving image. The thus obtained portrait is incorporated in a background image, such as an image of a room, to form an original picture element. The content represented by the original picture element is written as 5W1H information, in the original picture element index, and a pair, composed of the original picture element and the index therefor, are stored in a database.

After a scenario, for example, of an animation sequence has been automatically produced by the scenario production support system in the second embodiment, an original picture (statistic picture) representing a scene is selected for each scene in the scenario from among or several tens of thousands of original picture images. Since it would take an enormous time to manually perform the process, the process is also performed, in the following manner, by the reactor.

FIG. 24 is a diagram for explaining an overview of an operation performed by an original picture selection support system. When a scenario element index string is output by the reactor 9 in FIG. 18, the computer selects, from among several tens of thousands of original picture elements in the database, m original picture elements that correspond to the first scene. For this selection, 5W1H information, written in the scenario element index for the first scene of a scenario, is examined, and the original picture element, which has an original picture element index wherein similar 5W1H information is stored, is extracted for the original picture element database. The thus extracted m original picture elements match the first scene of the scenario, and a creator is permitted to select an optimal original picture element. In this example, assume that original picture element (1, 1) is selected.

Then, the computer examines the 5W1H information in the scenario element index for a second scene, extracts from the database the original picture element index in which the same information is written, places the extracted original picture element indexes and the index for the original picture element (1, 1) in the reactor processing tank, and initiates the agitation simulation. As a result, the original picture element index for the second scene, which is harmonically related to the original picture element (1, 1), is output by the reactor.

The above described processing is repeated for the third scene, the fourth scene, . . . , and original picture elements (1, 1) (2, 2) (3, 1) (4, 3) . . . that match the scenario are automatically selected.

According to the third embodiment, original pictures, which match the individual scenes of the scenario automatically generated by the scenario production support system in the second embodiment, can be automatically selected, and the labor effort required of a creator can be considerably reduced.

In the third embodiment, the automatic selection of original pictures that match the automatically generated scenario is performed. However, as is described in the embodiments, since common information, such as the 5W1H information and sensory information, is included in the musical element index, the scenario element index and the original picture element index, this information may be employed to first prepare an original picture element string and then to automatically generate a matching scenario, or to first prepare a musical element string and to then automatically generate a matching original picture element string. That is, the preparation order is arbitrary.

In the above embodiments, the creation production support system has been explained. This system can be implemented as a computer program, and when this program is stored in a storage medium and is read by a computer, the computer can be used as a creation production support apparatus.

INDUSTRIAL APPLICABILITY

According to the invention, since a creation is semi-automatically produced by using creative elements in accordance with desired settings, the creation of a large amount of data can be easily produced within a short period of time, while reducing the labor effort required of a creator.

The invention claimed is:

1. A creation production support method comprising the steps of:
   storing, in a database on a storage medium, elements of a creation along with added corresponding element indexes;
   extracting, from said database, element indexes for multiple creation elements that match a selection reference;
   calculating a correlation among information sets written in said extracted element indexes, and obtaining a set of element indexes from said extracted element indexes whose correlation satisfies an evaluation reference; and
   linking creation elements corresponding to element indexes that belong in said set, and outputting the results as a new creation onto a terminal device,
   wherein information written in said extracted element indexes consists of n sets of information to represent said information using n-dimensional vectors; and wherein said correlation among said extracted element indexes is evaluated by using an angle formed by said n-dimensional vectors of said extracted element indexes.

2. A creation production support method according to claim 1, wherein said creation elements are either music elements, scenario elements or original picture elements.

3. A creation production support method according to claim 1, wherein said element indexes include 5W1H information that represents the contents of a pair of said elements.

4. A creation production support method according to claim 1, wherein said extracted element indexes are simulated as pseudo points, and since said pseudo points are scattered throughout a pseudo processing tank, said correlation is obtained among said extracted element indexes that meet in said processing tank, and said extracted element indexes whose correlation satisfies said evaluation reference are linked together to form said set.

5. A creation production support apparatus comprising:
   a database for storing creation elements with added corresponding element indexes, wherein the database is on at least one of a network or a terminal device;
   extraction means for extracting, from said database, element indexes for multiple creation elements that match a selection reference;
   calculation means for calculating a correlation among information sets written in said extracted element indexes, and for obtaining a set of element indexes from said extracted element indexes whose correlation satisfies an evaluation reference; and
   output means for linking creation elements corresponding to element indexes that belong to said set and for outputting the results as a new creation on a terminal device, wherein information written in said element indexes consists of n sets of information to represent said information by n-dimensional vectors; and wherein said calculation means evaluates said correlation among said extracted element indexes by using an angle formed by said n-dimensional vectors of said extracted element indexes.

6. A creation production support apparatus according to claim 5, wherein said creation elements are either music elements, scenario elements or original picture elements.

7. A creation production support apparatus according to claim 5, wherein said element indexes include 5W1H information that represents the contents of a pair of said creation elements.

8. A creation production support apparatus according to claim 5, wherein said calculation means simulates, as pseudo points, said extracted element indexes, and since said pseudo points are scattered throughout a pseudo processing tank, said correlation is obtained among said extracted element indexes that meet in said processing tank, and said extracted element indexes whose correlation satisfies said evaluation reference are linked together to form said set of element indexes.

9. A creation production support apparatus according to one of claims 5 to 8, wherein said database is provided in an external storage device for a stand-alone computer.

10. A creation production support apparatus according to one of claims 5 to 8, wherein said database is provided for a server connected to a LAN, and said extraction means, said calculation means and said output means are provided for a client connected to said LAN.

11. A creation production support apparatus according to one of claims 5 to 8, wherein said database is provided for a server, and said extraction means, said calculation means and said output means are provided for a terminal device connected to said server via the Internet.

12. A creation production support apparatus according to claim 11, wherein a program that includes said extraction means, said calculation means and said output means is downloaded from said server to said terminal device.

13. A scenario creation support apparatus comprising:
   storage means for storing scenario elements that constitute parts of scenarios and corresponding scenario element indexes;
   extraction means for extracting, from said storage means, a plurality of scenario element indexes that match a predetermined scenario element selection reference;
   agitation means for performing, according to a pseudo physical rule, agitation simulation for said plurality of scenario element indexes, and for repeating said agitation simulation until a set of scenario element indexes is obtained from said plurality of scenario element indexes that match an evaluation reference for a predetermined condition setting for a scenario creation;
   recovery means for comparing said scenario element indexes in said set with paired corresponding scenario elements to recover a set of scenario elements;
   scenario linking means for linking of scenario elements in said set of scenario elements to generate and output a new scenario; and
   editing means for changing predetermined phrases in said scenario elements of said new scenario according to a predetermined table.

14. A scenario creation support apparatus according to claim 13, wherein said storage means stores, as a pair, a scenario element and a scenario element index that jointly describe the contents of said scenario element; and wherein said extraction means also extracts a scenario element index corresponding to a scenario element that matches said scenario element selection reference.

15. A scenario creation support apparatus according to claim 14, wherein each of said scenario element indexes includes at least one entry that corresponds to each setup for 5W1H and that describes a condition setting for said scenario element, and an entry of an adjective or an adjective verb that corresponds to said scenario element.

16. A scenario creation support apparatus according to claim 13, wherein said agitation simulation is based on an agitation process for which genetic algorithms are used.

17. A scenario creation support apparatus according to claim 13, wherein a scenario element is formed by providing, as a parameter, a condition setup required to perform said agitation simulation for said plurality of scenario element indexes stored in said storage means; and wherein, based on said obtained scenario element, a simulation of an agitation process is performed for said scenario element indexes.

18. A scenario creation support apparatus according to claim 17, wherein, when said scenario element indexes are regarded as physical entities, said parameter includes the direction of movement and the speed of said physical entities, and a growth level that corresponds to a mass.

19. A scenario creation support apparatus according to claim 17, wherein said agitation simulation includes a replacement process for changing, in consonance with a predetermined condition, one part of the entries in said scenario element indexes when a collision occurs among said scenario element indexes.

20. A scenario creation support apparatus according to claim 17, wherein said agitation simulation includes a generation process for employing, in consonance with a predetermined condition, one part of the entries in said scenario element indexes to generate a new scenario element index and a new scenario element when a collision occurs among said scenario element indexes.

21. A scenario creation support apparatus according to claim 17, wherein said agitation simulation includes a linking process for linking, in consonance with a predetermined condition, said scenario element indexes when a collision occurs among said scenario elements.

22. A scenario creation support apparatus according to claim 17, wherein said agitation simulation includes an arrangement process for linking and arranging, in consonance with a predetermined condition, said scenario element indexes when a collision occurs among said scenario elements.

23. A scenario creation support apparatus according to claim 17, wherein said agitation simulation includes an erasing process for erasing, in consonance with a predetermined condition, said scenario element indexes.

24. A scenario creation support apparatus according to claim 17, wherein said agitation means, based on a scenario element provided as a parameter that employs a scenario pattern as a setting condition, executes a simulation of an agitation process using said scenario pattern.

25. A scenario creation support method comprising:
 a storage step for the storage of scenario elements, which are components of a scenario, and paired scenario element indexes, which represent the contents of said scenario elements, wherein the storage step stores the scenario elements on a storage medium;
 an extraction step for the extraction, from said scenario elements and said scenario element indexes that are stored, of a plurality of scenario element indexes that match a predetermined scenario element selection reference;
 an agitation step for the performance, in accordance with a pseudo physical rule, of an agitation simulation for said plurality of scenario element indexes, and for the repetition of said agitation simulation until a set of scenario element indexes is obtained from said plurality of scenario element indexes that, for scenario creation, match an evaluation reference for a predetermined condition setting;
 a recovery step for the recovery of a set of scenario elements by comparing said scenario element indexes in said set with paired scenario elements;
 a scenario linking step for the linking of scenario elements of said set of scenario elements to generate and output a new scenario onto a terminal device; and
 an editing step of employing a predetermined table to change, in said scenario elements of said new scenario, predetermined phrases of said new scenario.

26. A computer-readable storage medium on which a program is stored for the execution of a scenario creation method on a terminal device, wherein the program stores, in a database on a storage medium, elements of a creation along with added corresponding element indexes; extracts from said database element indexes for multiple creation elements that match a selection reference; calculates a correlation among information sets written in said extracted element indexes, and obtaining a set of element indexes from said extracted element indexes whose correlation satisfies an evaluation reference; and links creation elements corresponding to element indexes that belong in said set, and outputting the results as a new creation onto a terminal device, wherein information written in said extracted element indexes consists of n sets of information to represent said information using n-dimensional vectors; and wherein said correlation among said extracted element indexes is evaluated by using an angle formed by said n-dimensional vectors of said extracted element indexes.

* * * * *